US005133081A

United States Patent [19]

Mayo

[11] Patent Number: 5,133,081

[45] Date of Patent: Jul. 21, 1992

[54] REMOTELY CONTROLLABLE MESSAGE BROADCAST SYSTEM INCLUDING CENTRAL PROGRAMMING STATION, REMOTE MESSAGE TRANSMITTERS AND REPEATERS

[76] Inventor: Scott T. Mayo, 5504 Knollwood Dr., Raleigh, N.C. 27609

[21] Appl. No.: 431,537

[22] Filed: Nov. 3, 1989

[51] Int. Cl.[5] ........................ H04B 7/14; G08G 1/09; H04H 9/00

[52] U.S. Cl. ........................................ 455/18; 455/66; 340/905; 369/7; 381/2

[58] Field of Search ..................... 455/3, 4, 17, 13, 16, 455/51, 66, 68, 70, 156, 158, 18, 7, 9, 11; 381/77, 82, 2, 3; 340/905, 994; 369/6, 7

[56] References Cited

U.S. PATENT DOCUMENTS

| | | | |
|---|---|---|---|
| 4,041,389 | 8/1977 | Oades | 455/17 |
| 4,350,970 | 9/1982 | von Tomkewitsch | 340/905 |
| 4,445,147 | 4/1984 | Kessman et al. | |
| 4,481,671 | 11/1984 | Mätzold et al. | |
| 4,578,815 | 3/1986 | Persinotti | |
| 4,636,880 | 1/1987 | Debell | |
| 4,703,368 | 10/1987 | Dakin | |
| 4,742,530 | 5/1988 | Kawai | |
| 4,772,873 | 9/1988 | Duncan | |
| 4,792,246 | 12/1988 | Mayo | |
| 4,887,308 | 12/1989 | Dutton | 455/158 |

FOREIGN PATENT DOCUMENTS

| | | | |
|---|---|---|---|
| 9005969 | 5/1990 | United Kingdom | 340/905 |

*Primary Examiner*—Reinhard J. Eisenzopf
*Assistant Examiner*—Lisa Charouel
*Attorney, Agent, or Firm*—Bell, Seltzer, Park & Gibson

[57] ABSTRACT

A remotely controllable message broadcast system includes a Central Programming Station, and many Remote Message Transmitters and repeaters. The Central Programming Station includes a library of broadcast messages and a set of Remote Message Transmitter programming instructions. A transmitter in the Central Programming Station transmits selected broadcast messages from the library and selected Remote Message Transmitter programming instructions from the set to all the Remote Message Transmitters over a wide area transmission network such as a licensed radio link. The transmitted instructions may include global instructions which apply to all Remote Message Transmitters and unique (addressable) programming commands which apply to an individual one of the Remote Message Transmitters. Each Remote Message Transmitter selectively stores received broadcast messages and programming instructions based on whether it is a global instruction or a unique addressable command for that particular Remote Message Transmitter. Each Remote Message Transmitter also includes a local transmitter for locally transmitting sequences of the stored broadcast messages under control of the stored programming instructions. Message sequences may be transmitted as an unlicensed or licensed radio transmission, or may be displayed on an electronic billboard. The Remote Message Transmitters may also transmit the message sequences to one or more repeaters so that each unique message sequence may be directed along particular areas of coverage. Accordingly, a single Central Programming Station may program large numbers of Remote Message Transmitters so that unique message sequences may be broadcast in specific areas of coverage.

215 Claims, 16 Drawing Sheets

REMOTELY CONTROLLABLE MESSAGE BROADCAST SYSTEM INCLUDING CENTRAL PROGRAMMING STATION, REMOTE MESSAGE TRANSMITTERS AND REPEATERS

FIELD OF THE INVENTION

This invention relates to message broadcast systems, and more particularly to a message broadcast system which is remotely controllable from a central station.

BACKGROUND OF THE INVENTION

Message broadcast systems such as radio networks are well known. Message broadcast systems may be employed to convey information along a highway for radio reception in vehicles traveling therealong or for reception by series of electronic billboards therealong for viewing by travellers in vehicles. Message broadcast systems may also be employed in localized coverage areas such as an amusement park or other tourist attraction, to broadcast messages for reception in vehicles or for announcement over public address systems.

Known message broadcasting systems have heretofore been limited in terms of the number of different messages that can be broadcast in different areas of the system. Known message broadcast systems have also been limited in their ability to update or change the broadcast messages. For example, U.S. Pat. No. 4,742,530, to Kawai discloses a radio relay system including a repeater which is able to detect a desired signal from an unwanted signal. However, each transmitter in the Kawai system is a licensed radio transmitter. A large number of licensed transmitters are necessary, to broadcast a large number of distinct message sequences over different areas of the system. As is well known to those having skill in the art, licensed transmitters are expensive, and radio slots are of limited availability. Accordingly, the number of different message areas is severely limited.

Other message broadcast systems have been devised which employ low power unlicensed transmission. See for example U.S. Pat. No. 4,578,815 to Persinotti, which discloses a "simulcast" system of low power transmitters which are employed to transmit the same message over a wide area simultaneously. Unfortunately, while such a low power transmission system eliminates the problems of multiple licensed transmitters, this system can only broadcast the same message over a large area. The Persinotti system cannot transmit different messages to different portions of its coverage area. Moreover, the system must be disabled when a new message is added, a message is eliminated, or the sequence of messages is changed. For a highway or other vital information system, this down-time is unacceptable.

It is known to employ remote radio transmitter control for communication systems. See for example U.S. Pat. No. 4,481,671 to Matzold et al., in which a remote control for a remote transmitters transmits switching and control signals within the some frequency bands. However, there is no suggestion as to how this system might be used in a remotely controllable message broadcast system, which is capable of broadcasting different messages in different areas of coverage, and which may be programmed simply without down-time.

Finally, it is known to use recorders for continuous playback of messages. See for example U.S. Pat. No. 4,636,880 to Debell which describes a programmable annunciator for periodic fade-in of specific message segments in a continuous broadcast or background audio. It is also known to employ solid state digital recorders for recording and playback of messages. See for example U.S. Pat. No. 4,772,873 to Duncan in which a digital recorder can record low frequencies and high frequencies by changing the frequency of the clock source. However, there is no suggestion in either of these references to use a digital recorder for purposes of obtaining a versatile, remotely controllable message broadcast system. Moreover, there is no suggestion for using such a digital recorder in a system which permits messages to be changed without down-time.

SUMMARY OF THE INVENTION

It is therefore an object of the present invention to provide a remotely controllable message broadcast system.

It is another object of the invention to provide a remotely controllable message broadcast system which is versatile and flexible.

It is yet another object of the present invention to provide a versatile, flexible remotely controllable message broadcast system which is capable of broadcasting different sets of messages in different broadcast areas of coverage.

It is still another object of the invention to provide a versatile remotely controllable message broadcast system which is capable of transmitting many messages in predetermined sequences or sets.

It is still another object of the present invention to provide a versatile, updatable and remotely controllable message broadcast system which allows messages to be changed without interrupting broadcasting.

It is still another object of the present invention to provide a remotely controllable message broadcast system which requires a minimum number of licensed transmitters.

These and other objects of the present invention are provided by a remotely controllable message broadcast system which includes three primary components: a Central Programming Station (CPS), a plurality of Remote Message Transmitters (RMT) and a plurality of repeaters. The Central Programming Station includes a library of broadcast messages and a set of Remote Message Transmitter programming instructions stored therein. The Central Programming Station also includes means for transmitting selected broadcast messages from the library and selected Remote Message Transmitter programming instructions (commands) from the set, to all of the Remote Message Transmitters over a wide area transmission network. For example, a licensed radio link, cellular telephone link, licensed FM subcarrier transmission link, cable television system or an optical fiber link may be employed.

The remote messages transmitted to the plurality of Remote Message Transmitters are transmitted on receipt of an external stimulus such as a externally generated programming command, occurrence of a predetermined time, or manual triggering of the Central Programming Station by an operator. The instructions transmitted by the Central Programming Station include global instructions which apply to all of the Remote Message Transmitters and unique (addressable) programming commands which apply to an individual one of the Remote Message Transmitters.

Each Remote Message Transmitter include a receiver for receiving the selected broadcast messages and selected remote message transmitter programming instructions from the Central Programming Station. The received broadcast messages and programming instructions are selectively stored in each Remote Message Transmitter based upon predetermined selection criteria. For example, the global programming instructions are always stored. The addressable programming instructions are only stored if the address of the particular Remote Message Transmitter matches the address of the instruction. Accordingly, a single Central Programming Station may transmit instructions and messages to hundreds or thousands of Remote Message Transmitters located in its wide area of transmission, and the Remote Message Transmitters will only store those instructions and messages intended for it. Each Remote Message Transmitter also includes a local transmitter for locally broadcasting at least one of the subset of the selectively stored broadcast messages stored therein. These messages are broadcast in the local area in a predetermined sequence and at predetermined times which are under control of the Remote Message Transmitter programming instructions stored therein. This transmission may be via an unlicensed radio transmission.

Associated with at least one of the Remote Message Transmitters is one or more repeaters. The repeaters receive the locally transmitted broadcast messages from the associated Remote Message Transmitter and locally retransmit the received messages using an unlicensed radio transmitter. The repeaters allow the messages from a Remote Message Transmitter to be directed along particular areas of coverage.

The remotely controllable message broadcast system of the present invention may employ a single Central Programming Station to program a large number of Remote Message Transmitters. Each Remote Message Transmitter and its associated repeaters is then capable of transmitting, on a continuous basis, a unique set of messages intended for that specific area of coverage. Accordingly, hundreds or thousands of unique message sets may be transmitted to hundreds or thousands of unique local areas using only a single unlicensed wide area transmitter. For example, a unique set of messages provided by a Remote Message Transmitter and its associated repeaters may be broadcast over a highway with the messages changing at each intersection of the highway. In fact, different messages may be provided for different directions of traffic flow or even for different lanes on the highway. An extremely versatile system is thereby provided.

Moreover, according to the present invention, the Central Programming Station may be employed to change the contents of the messages at a selected one or at all of the Remote Message Transmitters. The Central Programming Station may issue commands to store new broadcast messages at the Remote Message Transmitters, to change the sequence of messages being broadcast, to prioritize messages, or to define the number of repetitions of a particular message. Unique start and stop times for different messages may also be defined. Accordingly, each Remote Message Transmitter and its associated repeaters may be uniquely programmed to transmit unique sequences of messages continuously in predetermined changeable orders.

According to another aspect of the present invention, each Remote Message Transmitter is capable of continuously transmitting its message sequence while being simultaneously reprogrammed with new messages or new instructions. Simultaneous reprogramming and transmission is critical for a highway advisory system in which down-time may be dangerous for travelers. Simultaneous reprogramming and transmitting of the Remote Message Transmitters is provided by providing a digital recorder/player which is capable of simultaneously recording and playing broadcast messages.

In a preferred embodiment, the simultaneous digital recorder/player includes a random access memory, which is preferably a solid state random access memory, but which may be an erasable optical memory or digital audio tape machine. At least a pair of coder/decoders are connected to the random access memory. The first coder/decoder samples a received broadcast message, digitizes the sampled received broadcast message and stores the digitized received broadcast message beginning at a first address in the random access memory. The second coder/decoder reads a received broadcast message beginning at a second address in the random access memory and converts the read data into an analog signal.

According to the invention, the writing of data into the memory and the reading of data from the memory occurs during successive and alternating time intervals, so that simultaneous storage of received broadcast messages and transmission of stored broadcast messages may occur. In particular, the received and transmitted broadcast messages are band limited so that a predetermined sampling frequency is required. The random access memory and coder/decoders are controlled so that a sampled incoming message is stored at a first address and a broadcast message to be broadcast is read from a second address and provided to the coder/decoder quickly enough so that the incoming signal can be sampled and the outgoing signal can be converted to an analog signal to allow simultaneous recording and playback. Accordingly, the remotely controllable message broadcast system of the present invention need not be taken out of service for a programming update.

The Remote Message Transmitters and repeaters of the present invention may transmit analog messages over unlicensed FM or microwave transmission channels for reception at radios in vehicles traveling in the area of coverage. Alternatively, the messages may be transmitted over loudspeakers to provide a public address system in a tourist attraction or other site, in which the messages broadcast at each system may be varied and updated at will. Alternatively, the messages transmitted may be digital messages for receipt by a receiver, for example, in traveling vehicles which are equipped with a cathode ray tube or other display means for displaying the received messages. In this case, the vehicle may also include a controller and a keyboard for selecting a desired type of message to be received. An audible alarm may be sounded when the desired type of message is received. In yet another embodiment, the digital messages may be transmitted on billboards located, for example, along a highway, to provide continuous and updated graphical and alphanumeric messages along the highway, and thereby provide a remotely programmable billboard system.

It will be understood by those having skill in the art that the remotely controllable message broadcast system of the present invention need not employ repeaters, but rather may only employ a Central Programming Station and a large number of Remote Message Transmitters. Moreover, for smaller areas to be covered and less complicated systems, a Remote Message Transmitter and repeaters may be employed without the need for a Central Programming Station. Moreover, the Central Programming Station of the present invention may be employed in other message broadcast systems or other systems. Similarly, the Remote Message Transmitter of the present invention may be employed in other message broadcast systems or other systems. Finally, the unique simultaneous digital recorder/player may be employed in applications other than the remotely controllable message broadcast system of the present invention.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, Applicant provides this embodiment so that this disclosure will be thorough and complete, and will fully convey the scope of the invention to those skilled in the art. Like numbers refer to like components throughout.

Figure 1:
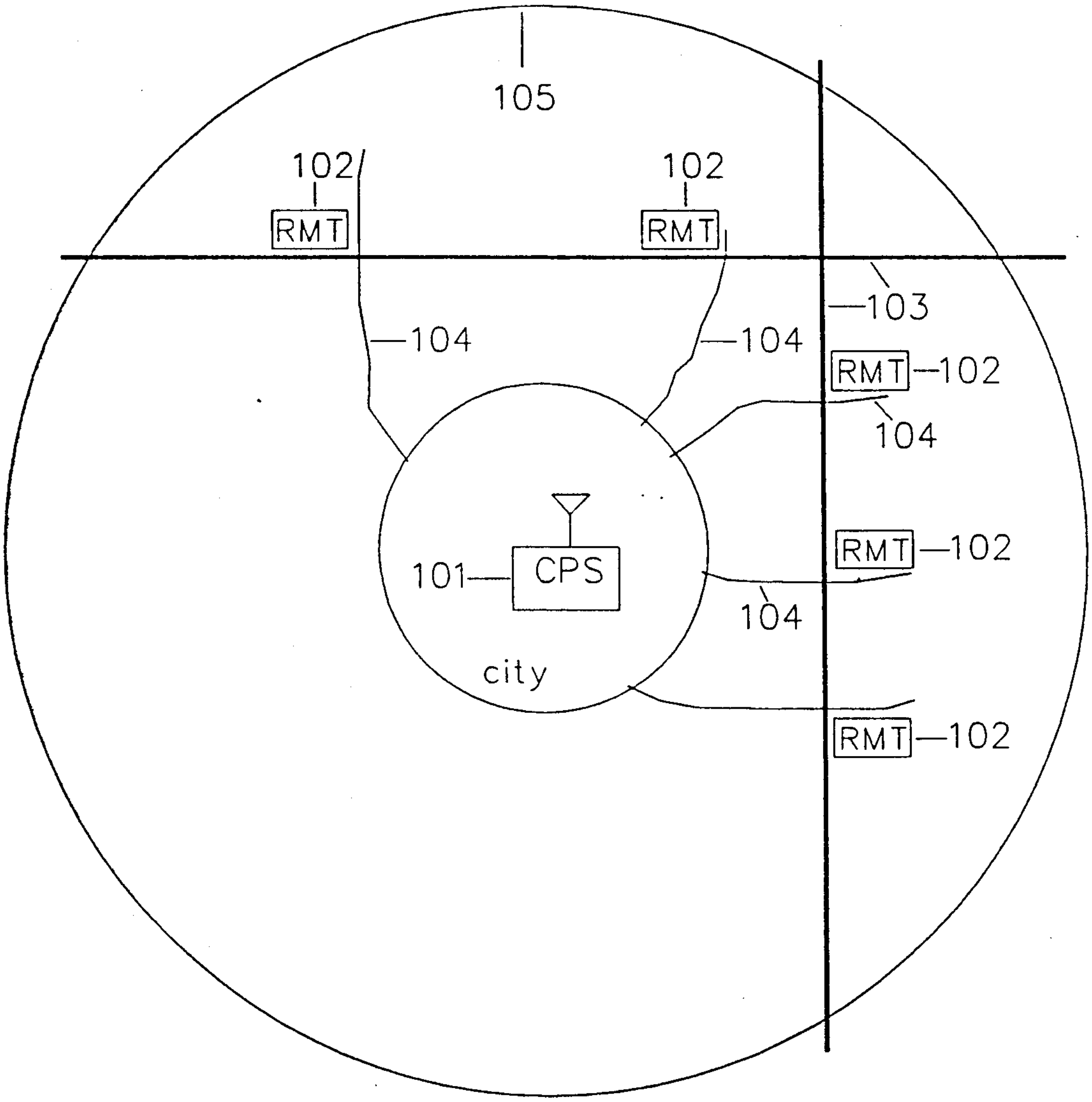
FIG. 1 is a block diagram illustration of a remotely controllable message broadcast system including a Central Programming Station that may program, control and monitor multiple Remote Message Transmitters located within range of its long range radio link, according to the present invention.

Referring now to FIG. 1, a remotely controllable message broadcast system, including a Central Programming Station (CPS) that may program, control and monitor multiple Remote Message Transmitters (RMT) is illustrated. FIG. 1 illustrates an application for a remotely programmable highway advisory radio system. A Central Programming Station (CPS) 101 includes at least a controller that transmits and receives digital and analog signals to addressable Remote Message Transceivers (RMT) 102 within the range of a long range radio link having a range for example of 15 to 30 miles as shown by circle 105. The controller interfaces to a long range radio and a message storage bank, for example, a tape player as described in connection with FIG. 5. Alternatively, cellular telephones may be used instead of the long range radio link to provide wireless remote control and programming. Commercial FM broadcast stations may use a subcarrier for programming. RMTs may be placed near highway exits 104. This will allow specific messages to be stored at specific locations. Travelers along highways 105 can tune their car radios to a standard, unused, FM broadcast band channel to listen for information relating to goods and services, as well as traffic and tourist information, at upcoming exits.

Each RMT 102 contains a transceiver to communicate with the CPS 101 as well as a low power broadcast band frequency modulated transmitter. It also contains a message recorder that can store up to hundreds of independent audio messages that may be transmitted over the low power transmitter to nearby radios. The exact messages and the order of transmission can be controlled from the CPS 101. New messages can be added and old ones deleted by remote control from the CPS, as described in detail below. The message recorder may operate in a continuous playback mode so that messages may play continuously and without interruption. Any message may be changed or deleted from a remote location, without causing interference to, or interrupting, other messages. Multiple RMTs may also be programmed from a CPS without interrupting the information services.

Figure 2:
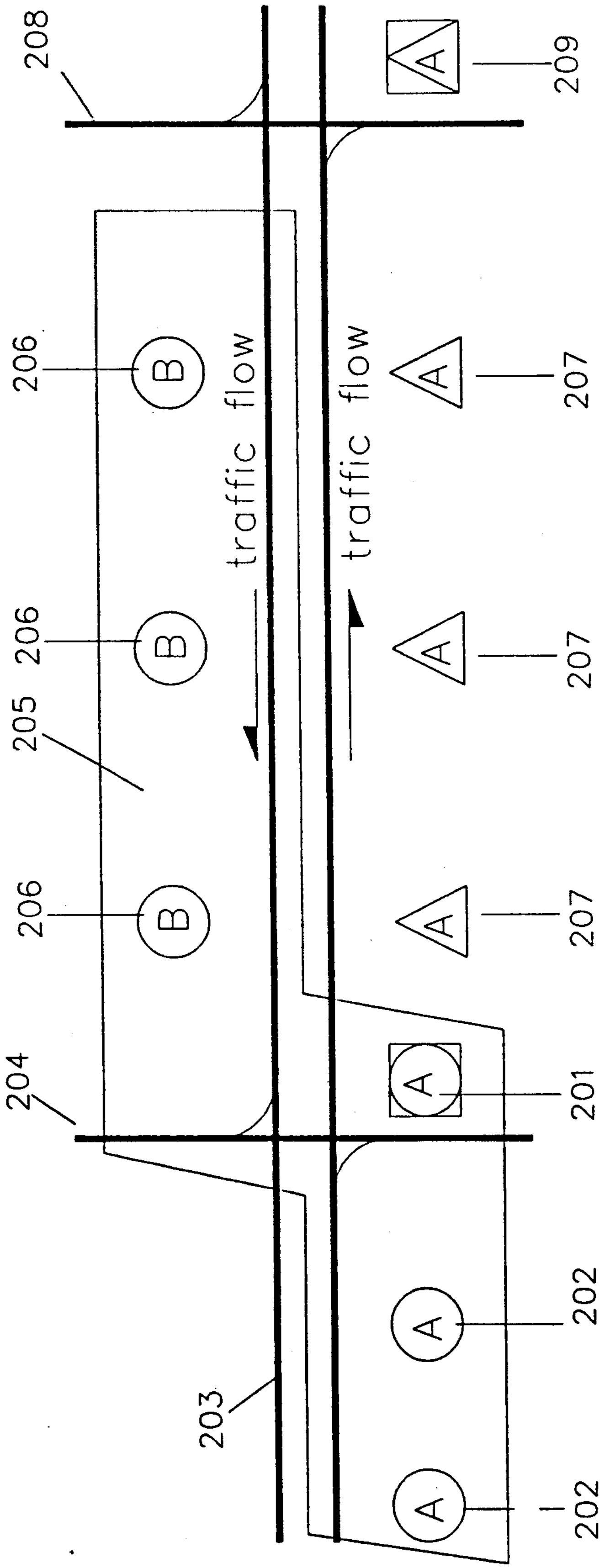
FIG. 2 is a block diagram illustration of Remote Message-Transmitters and repeaters installed along a highway with traffic flowing in two directions, according to the present invention.

Current FCC regulations limit the power and resulting broadcast range of any non-licensed transmitter using the commercial broadcast radio band. The range may only extend a few hundred yards. Highway travelers may be out of range before they can hear a complete message. Although the FCC may allow an increase in power to extend the range, the range may be extended another way. FIG. 2 illustrates the use of low power license-free radios as repeaters to extend the range up to several miles. Referring to FIG. 2, block 201 is an RMT containing a long range radio transceiver that can link it to the CPS 101 (FIG. 1). It also contains a low power FM broadcast band transmitter, a digital message recorder, and a low power transceiver that simultaneously broadcasts the same audio messages in an omnidirectional pattern on a separate radio channel that is significantly removed from the broadcast band radio channel.

A series of repeaters 202, 207 extend the range of the signal by receiving the signal and re-broadcasting it on the same broadcast band radio channel used by the RMT. The range of the repeaters may vary with several factors, but it will be approximately ¼ mile. In the U.S., the repeaters may use some of the frequencies shared by cordless telephones. If these frequencies are used, the repeaters may have to be carefully placed away from populated areas to minimize potentially interfering signals from cordless phones and other devices that may share the frequencies. Directional antennas may be used to help minimize interference from other devices.

FIG. 2 also illustrates how the area covered by each RMT may be controlled by the placement of repeaters. The area 205 is the area covered by the RMT 201 at exit 204. Traffic flowing in the right direction tunes to radio channel A, while traffic flowing in the left direction tunes to radio channel B. The two channels allow a single RMT 201 to transmit messages to traffic flowing in two directions. Shortly after vehicles pass the exit 204 covered by one RMT 201, they enter within range of a repeater 207 transmitting messages from the upcoming RMT 209. The FM receiver in the vehicle will receive only the strongest signal, which originates from the closest repeater.

Figure 3:
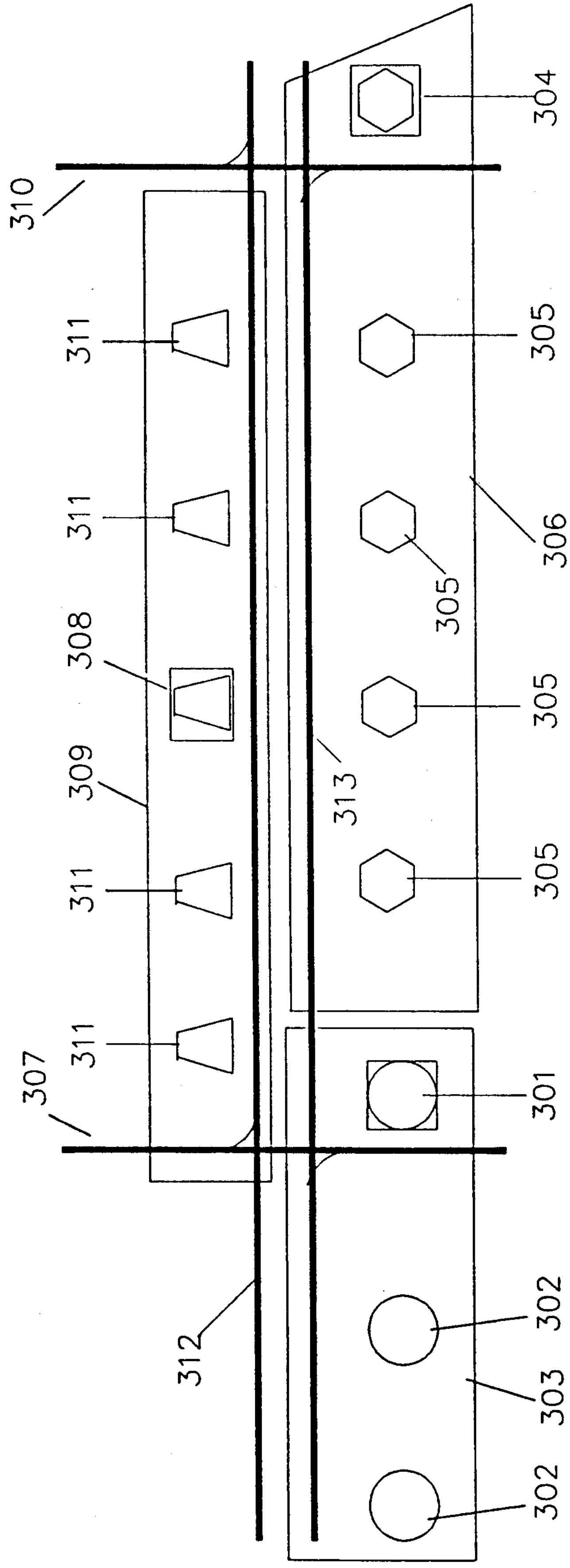
FIG. 3 is an alternate embodiment of the block diagram illustration of FIG. 2.

FIG. 3 illustrates an alternate embodiment where repeaters are arranged to address specific traffic lanes of traffic 312 and 313. Depending on the type of messages, this may be a more desirable configuration for some applications. RMT 308 may be placed between two exits 307 and 310, with repeaters 311 placed on either side of RMT 308 to cover lane 312. Since some signal degradation occurs with each repeater, the RMT 308 may be placed to minimize the number of repeaters required to achieve a desired range 309. A second RMT 304 may be placed at exit 310, with repeaters 305 providing coverage of area 306 including lane 313. Similar coverage for area 303 may be provided by RMT 301 and repeaters 302.

Figure 4:
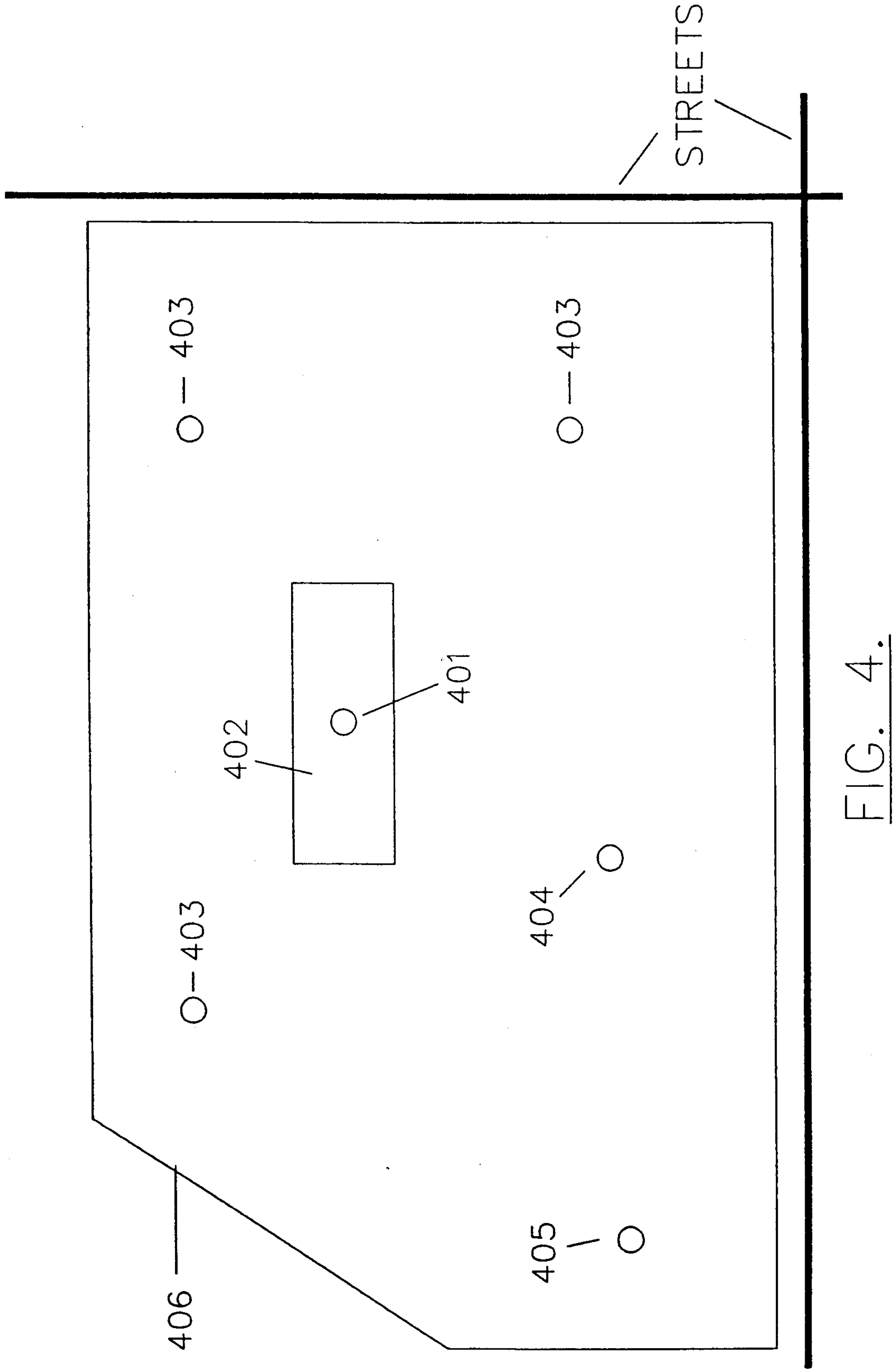
FIG. 4 is a block diagram illustration of repeaters configured to cover a relatively small area, according to the present invention.

FIG. 4 illustrates an application within an urban area or other small area. Area 406 may be a shopping center or tourist attraction surrounded by parking lot 406. Information relating to entrance tickets, tours, promotions, eating and entertainment facilities may be broadcast over an area that not only covers the parking lots 406, but also the adjacent streets. The digital recorder in RMT 401 may be locally programmed in this case instead of using a CPS. RMT 401 transmits over an unused fm broadcast band channel, and also transmits over a separate license-free radio channel to several repeaters 403, 404, and 405. Some repeaters 403 simply receive the transmission and rebroadcast the audio message over the same FM radio broadcast band channel. Repeater 404 not only rebroadcasts the signal, but also transmits the signal to repeater 405 using another license-free radio channel. Alternately, block 402 may be a ranger station in a national or state park. It may be remotely programmed over a long range radio link or telephone line. This would allow information to be dispensed on an as-needed basis and would allow the minimal staff to perform more essential functions.

Figure 5:
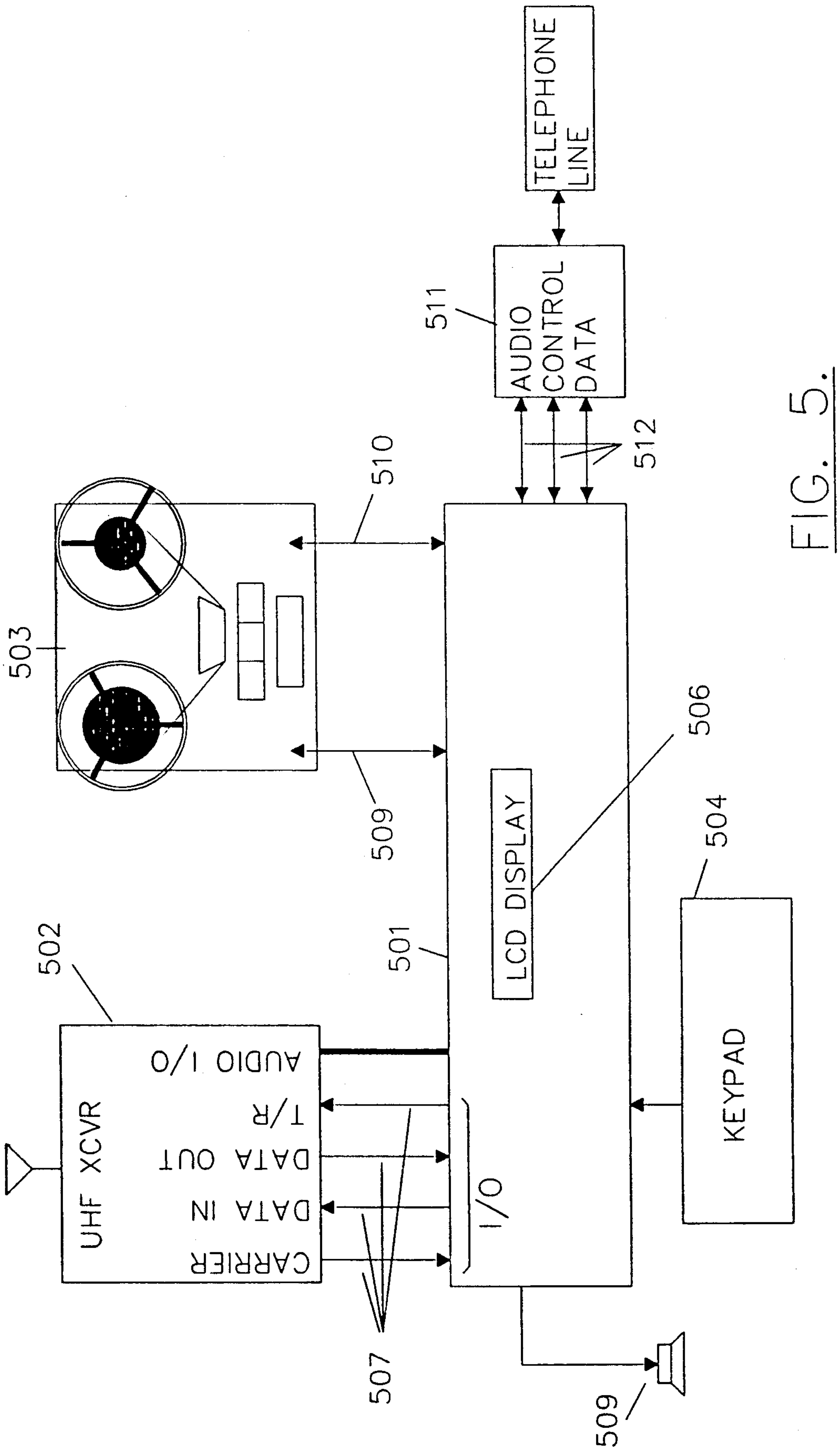
FIG. 5 is a block diagram illustration of a Central Programming Station according to the present invention.

FIG. 5 illustrates a block diagram of a CPS that may be used to program and monitor RMTs. The CPS controller 501 contains all of the circuitry that interfaces and controls other components of the system. A storage bank of audio messages may be kept on magnetic tape 503 or other recording media. The controller interface to the tape deck 503 consists of audio inputs and outputs 509 as well as transport control lines 510. If a digital audio tape deck is used, the control interface may include a tape counter tracking line to enable more accurate control of the messages.

Controller 501 contains internal memory for storing track and program index codes. These codes enable precise control of the length of audio messages to be inserted at remote locations. The internal memory is used to store the format information of the medium, including the total recording time available, the total number of messages, the number of active messages, the start address of each message slot, and the maximum message length for each slot. The memory is also used to store information pertaining to each message, including title or identification code, message length, pause length at end of message, and time information that may make the message active or inactive depending on the time of the day.

A UHF transceiver (XCVR) 502 capable of transmitting and receiving analog and digital signals is also connected to the controller 501. The transceiver is used to transmit audio messages to RMTs. Digital commands can be transmitted and received as well. Since there may be hundreds of RMTs sharing the same long range radio link, each RMT must be assigned a digitally encoded address that will distinguish it from other RMTs. In order to program a particular RMT, a transmission is sent from the CPS. The digital transmission consists of one or more commands, and a 16 bit address code. The RMT must reply within a 300 msec time frame that it received the transmission and is ready for programming. The controller 501 contains the same type of digital recorder that is in each remote transmitter, so it ensures the audio message is properly formatted before it is transmitted to the remote.

If the command is to change the order of messages or to assign priority to one or more messages, a single transmission is all that is required from the CPS. If a new audio message is to be installed in the RMT, the CPS controller must first pick a memory slot for the new message. After some handshake signals are transmitted between the transceivers, the audio message is cued and transmitted. The CPS controller can then request a playback to verify the quality of the recording. A monitor speaker 509 allows a programmer to play back the recorded message. This is optional, since the RMT may contain a circuit that constantly looks at the received signal strength. If the transmission is interrupted for a few milliseconds, or if the signal to noise ratio drops below a preset value (25 dB typically), the RMT instructs the CPS to repeat the message.

In some applications, a telephone line may be used to program messages remotely instead of a long range radio link. A modem 511 interfaces between the CPS controller 501 and the telephone line. The modem is capable of dialling a RMT (or recorder without a transmitter), and then allowing audio and digitally encoded FSK signals to transfer between recorders. The same format is used as with the radio link, so that after the appropriate handshaking codes are received, the audio messages can be recorded on the remote message recorder.

The CPS controller 501 also monitors the status of all RMTs. When not in the programming mode, the controller polls each RMT at periodic intervals to check for proper operation at each location. Each RMT will normally be connected to an AC power source, but will function with a backup battery in the event of a power loss. The loss of AC power will cause the RMT to transmit an alarm code to the CPS. This will allow a technician time to change the battery if the power is not restored in a reasonable time. Some RMTs may be equipped with devices to count or synchronize some messages with traffic. A vehicle detector can provide a clocked signal to the RMT for aiding in traffic control message programming and marketing information.

The CPS controller 501 determines the function of all connected components depending on commands entered at the keypad 504. When not in the programming mode, the CPS controller may operate in either a standby mode or a status polling mode. In the standby mode, the CPS may receive alarm signals transmitted from the RMTs, but will not actively poll each RMT. In the status polling mode, each RMT will be addressed and checked for proper operation.

The liquid crystal display (LCD) 506 indicates the operating mode at all times. After receiving an alarm transmission from an RMT, the RMT ID code is displayed with the alarm condition. When programming an RMT, the display is used to display a message title and memory slot ID code. The ID code is used by the digital recorder in the RMT to identify a particular message (memory location). The message title is a one to sixteen character alpha-numeric title to aid the programmer in identifying a particular message. The slot ID code and title are stored in memory at the RMT so that the CPS can request a listing of all stored messages and their status at any time without having to monitor the actual broadcast to identify messages.

Figure 6:
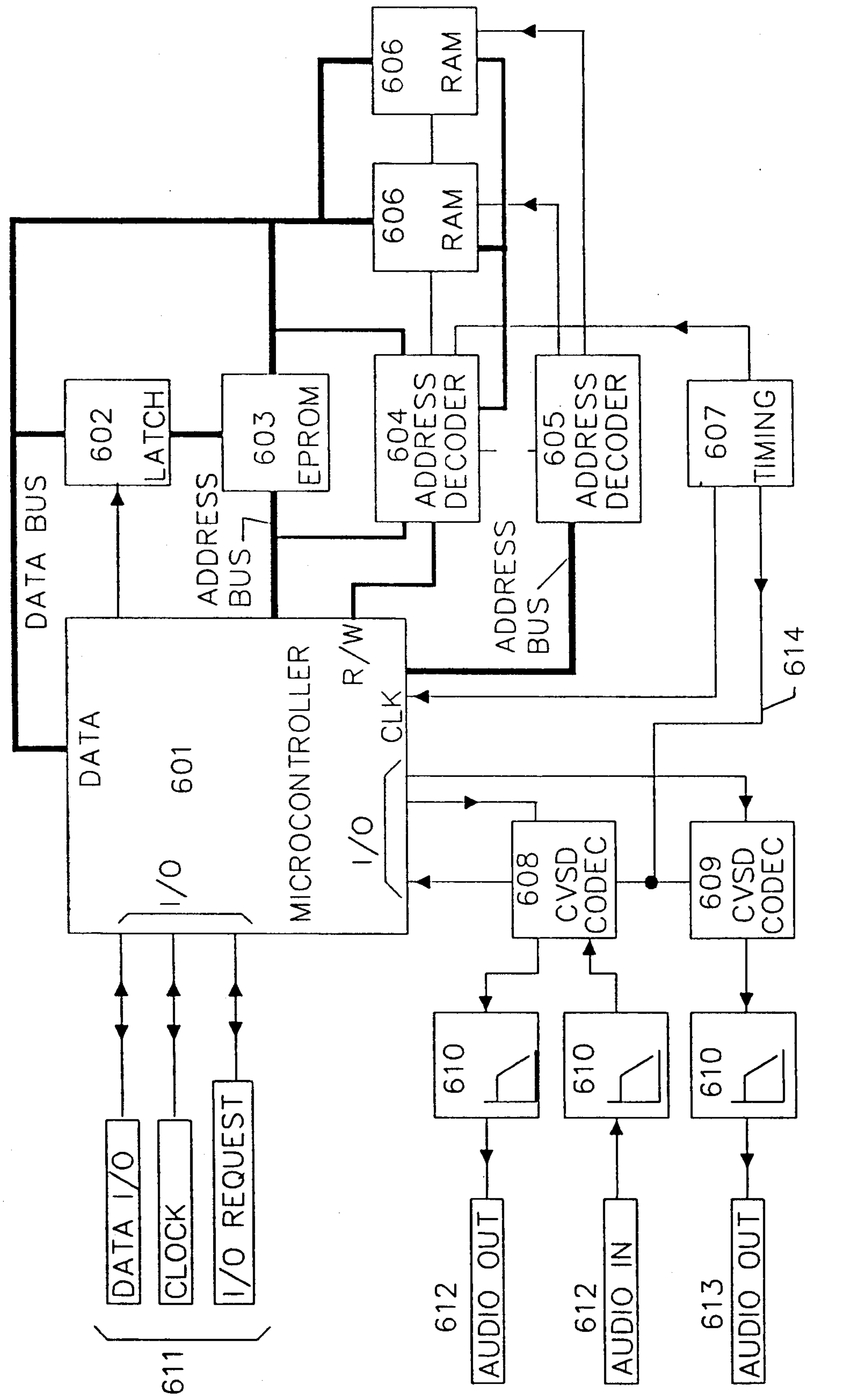
FIG. 6 is a block diagram illustration of a solid state digital recorder according to the present invention.

FIG. 6 is a block diagram of a solid state digital recorder according to the invention. A major advance of the present invention which makes it suitable for remote control lies in its use of a formatted storage medium. Whether the medium is magnetic tape, optical disc, or solid state memory, the medium is initially formatted into a number of message files (or memory slots), each with a preset starting address and maximum recording time. Since each message may then be addressed independently, reprogramming does not require recording over the entire medium, but simply the deletion of unwanted messages and the insertion of replacement messages. Messages may be shorter than the formatted maximum recording time, since the message length is stored in memory.

Referring now to FIG. 6, the digital recorder converts analog audio signals at inputs 612 to digitally encoded data that may be stored in digital Random Access Memory (RAM) 606. Continuously variable slope delta (CVSD) modulator/demodulator coder/decoder (codec) circuit 608 operates in record mode to convert band limited audio signals from filters 610 to a serial bit stream that is sampled by the microcontroller 601. Codec 608 also converts data from RAM 606 into audio signals in playback mode. Codec 609 operates in playback mode only. The codec blocks 608 and 609 contain a shift register that converts the serial data inputs/outputs into eight bit blocks of data that is clocked out/in to the microcontroller 601. This allows the microcontroller to transfer data to or from the codecs in up to eight codec clock cycles controlled by clock 614.

The circuit illustrated in FIG. 6 uses microcontroller 601 to coordinate all of the required functions, while being able to address specific memory locations using address decoders 604 and 605. In order to remotely program a digital recorder without interrupting messages that may currently being played, the microcontroller 601 accesses specific blocks of RAM 606 corresponding to specific messages. The RAM 606 is shared by both a digital player and a digital recorder/player.

Codec 608 can operate in either the play or record mode as determined by the microcontroller 601, while codec 609 operates in the play mode only. The firmware embedded in the EPROM 603 controls the operation of the microcontroller 601. Codecs 608 and 609 are constantly clocked by the timing logic 607, which also provides the master clock signal for the microcontroller 601. Since the audio being recorded is sampled at time intervals much longer than the microcontroller clock intervals, the microcontroller can spend the time between samples manipulating data in and out of memory 606. Audio messages can be band-limited to frequencies below 3.5 KHz by lowpass filters 610. The codec clock frequency will typically be 38 KHz. This corresponds to a clock period of 263 microseconds. Eight bit shift registers in codec blocks 608 and 609 extend the sampling clock period to 2.1 milliseconds from the microcontroller 601.

Accordingly, every 2.1 milliseconds, the microcontroller performs a variety of tasks depending on the operating modes. If codec 608 is in the playback mode, the microcontroller 601 fetches the next byte of data from RAM 606 and latches it into an 8 bit shift register in codec block 608. Codec 609 is always in the playback mode so the microcontroller 601 fetches the next byte of data in the current message block of RAM 606 and latches it into an 8 bit shift register in block 609. If codec 608 is in the record mode, the microcontroller 601 fetches the 8 sampled bits of data from codec 608 and places them in the next byte of RAM 606 reserved for the current message The current message for codec 608 is almost always different from the current message for codec 609. The reason for having separate codecs 608 and 609 is to be able to simultaneously record and play messages using the same recording medium, and without having interference between the two functions. After updating the codecs, serial communications can be established between the digital recorder of FIG. 6 and the recorder controller illustrated in FIG. 7.

It will be understood by those having skill in the art that multiple recording and playback devices may need to be employed to allow simultaneous recording and playback. Two or more separate message playback devices and at least one recording device may have the same solid state recording medium. The use of mechanical recorders, such as digital audio tape or erasable optical disk, may require three or more recording devices and three or more playback devices to provide simultaneous recording and playback, because of the longer access time of such devices.

Figure 7:
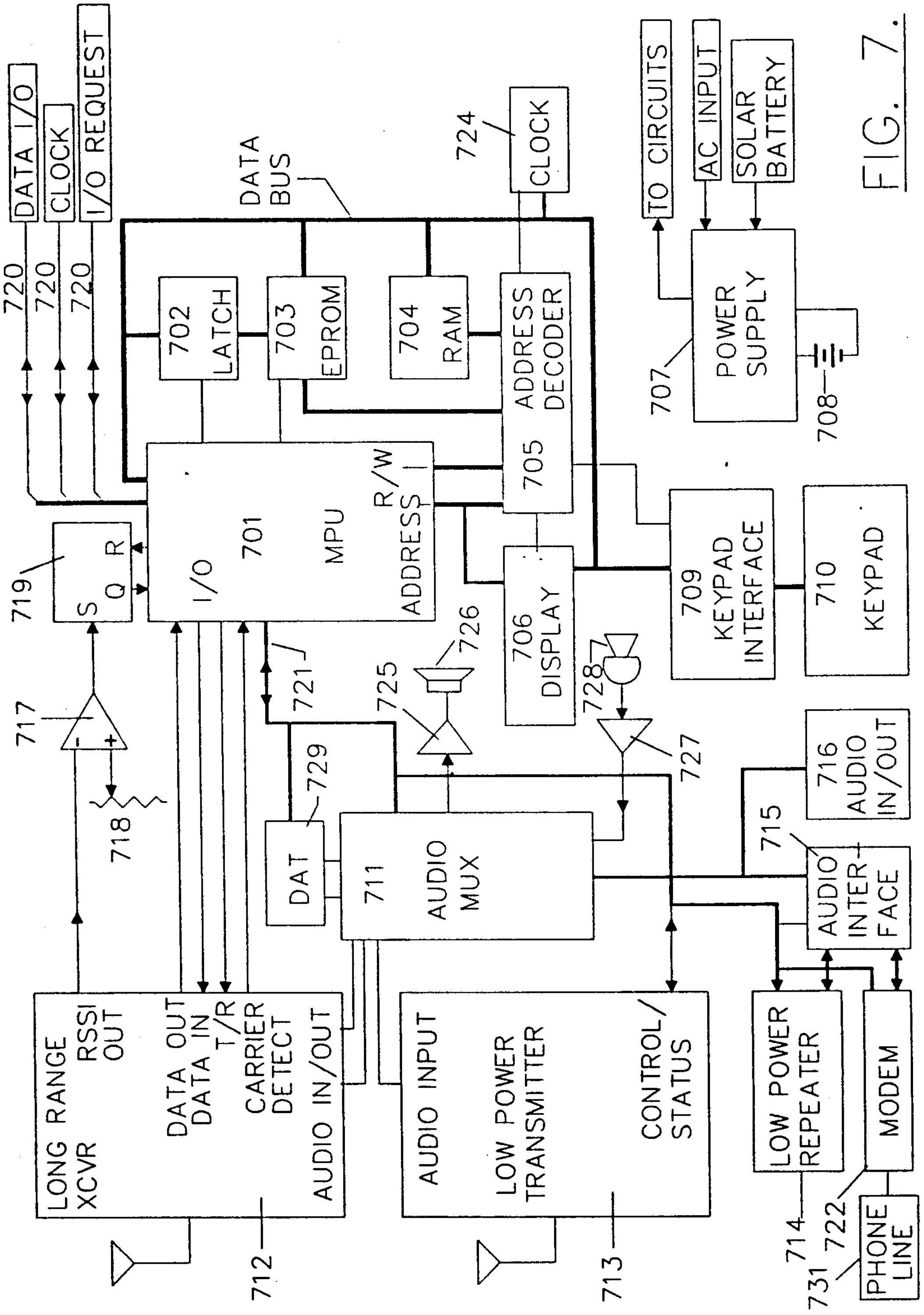
FIG. 7 is a block diagram illustrating the communications links and control circuitry contained in a Remote Message Transmitter or Central Programming Station, according to the present invention.

Referring now to FIG. 7, a block diagram illustrating the communications links and control circuitry in an RMT or CPS, according to the invention, is shown. The controller illustrated in FIG. 7 contains all of the necessary functions except the solid state digital recorder of FIG. 6. Firmware in EPROM 703 allows microcontroller 701 to coordinate the functions of a digital recorder system (FIG. 6) attached through serial link 720, and various other input and output devices.

Address decoder and chip selection logic is provided by block 705. Commands and data can be entered at keypad 710. The microcontroller 701 interprets the commands and performs functions as determined by the firmware in EPROM 703. Operating modes and data entries can be displayed on a liquid crystal alphanumeric display 706. The RMT may be located at a remote area where AC power is not available. Accordingly, power supply 707 is designed to include a battery 708. A solar battery may also be included. An AC input may also be provided.

Depending on which blocks are attached to microcontroller 701 FIG. 7 may illustrate the controller block used at a CPS, or the controller and digital recorder interface used as an RMT. Either a long range radio transceiver 712 or a modem 722 connected to a telephone line 731 or some other wireline can provide the means to remotely control similar units from a single location. Individual units have identification codes stored in battery backed RAM 704. The CPS can address specific RMTs over a radio or phone link and instruct them to perform various functions. The RMTs may also be polled at periodic intervals and checked for malfunctions.

A primary function of the controller is to control the digital recorder through serial link 720. Audio signals can be routed to and from different blocks by the multiplexer (MUX) 711 that is controlled by microcontroller 701 through I/O lines 721. The controller interfaces to the audio input and outputs of the digital recorder through block 716. One audio output of the digital recorder is normally routed to a low power broadcast band transmitter 713. In an RMT, the long range transceiver 712 receives handshaking digital codes and then audio messages to be stored in the digital recorder of FIG. 6.

Another embodiment of the present invention utilizes a plurality of compact disc or digital audio tape recorders that may require up to several seconds to access a desired message due to mechanical limitations. In this system, one recorder may be currently playing a message, while another is in the pause mode, ready to play the next message when cued. Still another recorder is free to record new messages from a remote programmer. Each of the plurality of records has identical information recorded in identical formats. A remote programmer can replace a message on one of the recorders without interrupting playback from the other recorders. After the new message is recorded, it is copied onto the recording media of the other machines when they are disabled from the active or pause modes.

This embodiment may typically be used in automatic programming systems for commercial radio stations, where a highly reliable means must be available for storing and retrieving audio information such as music, news, advertisements, and other messages. The recorders may be programmed remotely, as from an editing studio, or from another station via a satellite link. A controller interfaces between the bank of recorders and a remote link to the programming station. The controller contains a microprocessor programmed to insure the proper operation of the system. The timing and control signals are monitored to detect a faulty recorder and to allow for automatic transfer to a working recorder.

Before any messages can be stored in the digital recorder, the storage medium must be formatted. This is a process that divides up the available memory space into blocks of memory with boundaries identified by memory addresses. If the total available memory is eight million bits for example, and the audio sampling rate is 38 kilobits per second, the maximum duration of an audio message is about 210 seconds or 3.5 minutes. Many applications of the RMT will require much shorter messages that are constantly repeated. In this case, the total available memory can be divided in a way to allow memory "slots" that can be addressed and used to store smaller messages. Some applications will require messages of various lengths, so if the maximum lengths of messages can be anticipated in advance, the memory can be formatted to be used with messages no longer than the maximum allowed by the format. In the example of a system with 210 available seconds, the memory may be formatted into 7 slots of various lengths. Two 60 second slots, one 30 second slot, and four 15 second slots make up one possible configuration.

Microcontroller 701 of FIG. 7 communicates with microcontroller 601 of FIG. 6 via serial link 720. First, microcontroller 701 determines the available memory in the digital recorder by instructing microcontroller 601 to write data into RAM 606 and then reading it back. Microcontroller 701 then calculates the recording time available and displays it on display 706. The programmer can then enter various parameters defining the types and lengths of messages. After the memory slots have been defined, they are regarded as empty until program data is stored in them. The starting and ending addresses are stored in battery backed RAM 704.

When a slot is selected to be programmed, a one to sixteen character label is entered through keypad 710, via long range transceiver 712, or via a wire line and modem 722. This label is stored in battery backed RAM 704 at an address determined by the slot number. An additional 2 byte hexadecimal ID code is also stored. This additional code is used in most situations to minimize the time required for transmitting commands and status requests. The 2 byte ID code is normally used for all transmissions to instruct an RMT to enable or disable a particular message. The programmer will have a guide that lists ID codes and associated messages. Some impromptu messages may not be listed in the guide, since they may be designed to broadcast a preset number of times only.

A programmer at the CPS may want to identify all active messages at a particular RMT. The CPS transmits a command to list all active commands (the ones being broadcast). For each active message, display 706 indicates the 2 byte ID code. If the programmer wants further identification, the RMT can transmit the 16 character message label. If the programmer still cannot identify the particular message, a message playback can be requested from the RMT. The long range link can play back the message in question in part or whole depending on the command. One command only plays back the first ten seconds of the message, while another command causes the complete message to be played. All of this can be accomplished without interrupting the broadcasting of messages at the RMT. When a particular slot is selected to be edited or reprogrammed, if it is currently an active message, it can remain current until the changes have been entered and acknowledged.

A portion of RAM 606 of FIG. 6 is reserved for adding new messages. The slot reserved for this portion must be large enough to accommodate the largest anticipated message to be stored. An alternate scheme would remove the message to be edited from the active list until all changes have been made. It can then be restored to the active list without interrupting the playback of other messages.

Since the remote programming of messages relies on the use of radio or telephone circuits to send audio signals, there is a problem of noise added to the signal from the connecting link. Although the radio would typically use frequency modulation techniques, propagation variations and interfering signals may distort the signal or make it barely intelligible. Radio transceiver 712 in each RMT has an RSSI (received signal strength indicator) output that is a DC voltage proportional to the logarithm of the received signal strength. An analog to digital converter may be used to convert the RSSI signal to a digital format that may be monitored by microcontroller 701. During programming, if the RSSI value drops below a pre-determined value stored in battery backed RAM 704, the RMT may transmit an error code to the CPS and request another transmission.

A simpler approach is illustrated in FIG. 7. Comparator 717 may be used to compare the RSSI DC level to a value set by potentiometer 718. If the RSSI value drops below the preset value, comparator 717 sets flip flop 719. controller 701 examines the output of flip flop 719 after the transmission is complete. If it is set, then one or more noise spikes occurred during the transmission. The programmer may request a playback to determine the quality of the reception, or the programming can be repeated. Typically, transmission channels using wire lines or telephone lines will have a higher signal to noise ratio, and the noise added to the signal will probably be negligible for most applications. A short ten second playback can be requested to verify the signal.

Optionally, block 75, which is an audio interface module for the modem, can contain a 1 KHz notch filter, bandpass filter, signal splitter, rectifier circuits, and comparator. When a telephone line is used, and long distance circuits may be used to connect the CPS to the RMT, a 1 KHz tone may be used to first test the transmission channel. Before the message begins, the CPS transmits a 1 KHz tone over modem 722 for approximately 1 second. The RMT uses the bandpass filter to limit the bandwidth of the received signal and noise. The signal is split, and one side filters out the 1 KHz tone. The two signals are compared by the comparator, and if the ratio of the two signals is below a preset value of approximately 25 dB, an error code is transmitted to the CPS to attempt to find another line. Modem 722 has the ability to hang up, answer, and dial up the telephone line. It uses frequency shift keying (FSK) for transmitting data to the receiving modem. Controller 701 uses some I/0 lines 721 for controlling the modem and sending/receiving serial data. Modem 722 also allows audio signals from the audio interface module 715 to be transmitted/received over the phone line.

Radio transceiver 712 is connected to controller 701 via other I/0 lines. The radio handles audio and digital signals. The digital demodulator may output transistor-transistor logic (TTL) level signals, and the modulator may accept TTL level signals. Digital transmission may be accomplished using a Manchester phase-encoded signalling format. Typical applications will use normal business band radio licenses for the long range radio links. These require the use of narrow band FM radios. The receiver bandwidth will typically be limited to about 12 to 15 KHz. A typical baud rate for the encoder/decoder may be about 2K baud. The transmission format will typically consist of a 20 bit preamble bit string to allow the receiving decoder to synchronize its internal clock to the transmitters's clock. The preamble bits are followed by a start bit. After the decoder detects the start bit, it stores the next ten bits and checks for errors. Normally, 8 bits are used for either commands, addressing or data. Two parity bits accompany each eight bit byte. These bits are compared to the calculated parity for the preceding 8 bits.

If no errors occur, then the decoder continues to decode the incoming data. If an error is detected, the data is rejected, and the response depends on where the error occurs. The first data byte is normally a command. Firmware in EPROM 703 has an embedded table of commands. The decoded command is compared to the commands in the table and jumps to a specific routine depending on the particular command. After the command is successfully decoded, the decoder stores the next 2 bytes and compares them to a 16 bit address code stored in battery backed RAM 704. If the bytes match, the decoder proceeds to decode the rest of the transmission, otherwise the transmission is intended for another RMT, and the decoder ignores the rest of the transmission. The only exception to this occurs when global commands are decoded. These global commands do not require an address because they are intended for all RMTs. These commands can cause all RMTs to perform a function simultaneously without having to singly address each RMT. Such a command may be used to enable/disable 200 or more remote message transmitters at once.

Firmware in EPROM 703 distinguishes a CPS from an RMT. Each one performs very similar functions, but the RMTs are made to operate continuously in a transmitting mode. A set of stored messages are repeatedly transmitted over a low power broadcast band transmitter or loudspeaker. The CPS normally monitors the long range link(s) for alarm conditions. When placed in the programming mode, the CPS still monitors for alarm transmissions, but is also able to program or remotely control one or more RMTs.

The CPS has an internal digital recorder identical to the RMT digital recorders. It has at least as much memory as the remotes for storing and editing any length message to be installed in the RMTs. Since the memory chips are fairly expensive, it is important not to waste the memory with dead space (gaps in the audio). A pause of various lengths can be inserted by controller 701 between messages. The CPS can edit the audio messages before transmission to remove pauses before and after the message to maximize the message content before storage. It also displays the size of the slot to be programmed as well as the real time of the message being edited for transmission. If the message being entered is too long for the slot, an error message is displayed. If the message is shorter than the slot, the slot is not completely filled, but there is no gap when the message is played. Any slot can be programmed with messages shorter than the slot time.

When the audio message is ready for transmission, the CPS transmits a programming command to the desired RMT. The RMT responds with a list of its programming index. This is a list of the number of slots with their characteristics. If the slots have messages already, the ID codes of the messages are displayed after the slot number and length of the slot in seconds. The status of the slot is displayed as well. The slot may already be programmed, but the message may not be played or broadcast. It may be a message that only plays at certain times of day depending on the output of the real time clock 704. If the slot is currently one of the messages being played, it is considered to be active. If it is programmed but not being played, it is inactive. If the slot is not programmed, it is empty and does not have a message ID code. Display 706 indicates the slot is empty and ready to be programmed.

Once the CPS selects a slot and transmits a message to the RMT, the new message status is entered. It can be made active immediately, or it can be programmed to play at a later time. It can also be programmed to play in a particular order with other messages. Another option is to program it to play only a certain number of times and then become inactive, or erased. A priority can be assigned to the message that allows it to be repeated over and over without playing other messages until the RMT is reprogrammed. The message can be repeated once every second or third message, etc.

A digital audio tape (DAT) deck 709 is normally used to store a library of messages that can at any time be accessed to program an RMT. Since solid state memory chips will normally be used in the RMTs, and they are relatively expensive, all potential messages cannot be stored in an RMT at one time. A CPS can be programmed to remotely program multiple RMTs automatically depending on the time of day or week as determined by real time clock 724. The programming information is stored in RAM 704 and is entered using keypad 710 or via any other radio or phone link. All input/output audio signals to/from DAT 719 are routed by the audio multiplexer 711. DAT 729 is controlled over the controller I/O bus 721. The tape index is monitored by controller 701 and is used to locate particular messages. The message index is also stored in RAM 704.

As stated before, the system in FIG. 7 can be either a CPS or an RMT. Microcontroller 701 can optionally be configured to accept messages and programming commands over the telephone line or cellular phone using modem 722 and modem interface 715. Modem 722 can be configured to answer the phone and pass DTMF tones to the interface 715. The interface 715 has a DTMF decoder that can decode tones entered by a remote telephone on the phone's keypad. For this type of setup, the remote may either program a CPS or an RMT directly.

After the connection is made, a security "password" code must be entered to enable any programming. Otherwise, modem 722 is instructed to hang up after about ten seconds. Once the password is accepted, a tone is transmitted to indicate the controller is ready to accept the programming. A command must be entered using DTMF tones before audio messages can be entered. If the remote programmer is using a similar controller, the tones and programming are accomplished automatically. If the remote programmer is only using a telephone, first, the ID of the RMT to be programmed must be entered. If the unit is an RMT, the ID code must match the internal code or an error tone is generated. If the next two entries are incorrect, the RMT hangs up. If the unit is a CPS, the entered ID must match the ID of a valid RMT or the unit hangs up as described above. An ID match causes a ready tone to be transmitted. Block 715 may include an internal voice synthesis circuit to relay voice instructions instead of audio tones. Alternatively, a portion of RAM 606 may be used to store audio messages to provide "user-friendly" responses to commands entered over the phone line. A typical audio response may tell the programmer how much time will be available for the new message and which keys to press for different functions.

Remote programming over the phone line or cellular phone allows spontaneous messages to be entered by any person with a telephone and the proper access codes. For some applications that normally would require an operator to take incoming emergency messages, format and install them in a particular RMT, the programming can instead be handled by the originator of the message over an ordinary phone line. The programming, therefore, could be totally automatic, minimizing the expense of operating the RMT system. Some slots may be reserved for this type of spontaneous remote programming, and other slots may be protected from being recorded over by this programming mode by assigning programming modes to each slot when formatting the storage medium.

Figure 8:
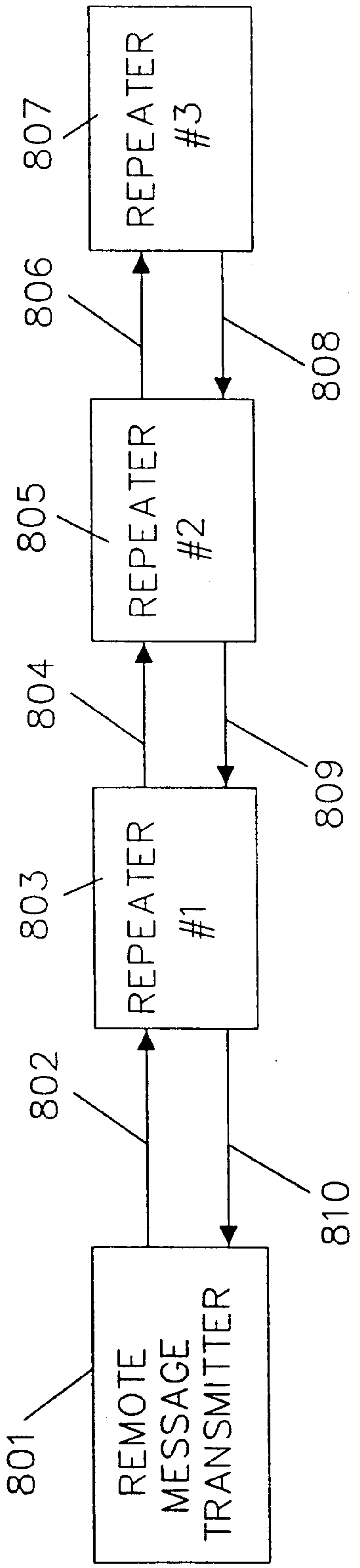
FIG. 8 illustrates a block diagram of a Remote Message transmitter and repeater according to the present invention.

One use of the RMT is in a remotely programmable radio "billboard" for use along highways or streets. Traffic usually travels at such a rate that the vehicle may be out of range of the low power transmitter before one or more messages can be received. As previously illustrated in FIGS. 2, 3, and 4, low power license-free repeaters can be used to relay the audio messages to other low power broadcast band transmitters or public address speakers. FIG. 8 illustrates a simple configuration where RMT 801 transmits over link 802 to repeater 803. Repeater 803 then retransmits the audio signals to repeater 805 over link 804, etc.

The repeaters contain a receiver using a license-free radio channel, which in this case is one of the 49 MHz frequencies shared by some cordless telephones. At the present time in the United States, the Federal Communications Commission (FCC) has set aside some frequencies that may be used for almost any purpose as long as the power and range are severely limited. The restrictions are on the transmitter, limiting output power and transmission bandwidth, among other things. A highly sensitive and selective receiver can be used to maximize the effective range of the repeater and help reject interfering signals that may share the same or nearby channels. The range between repeaters may extend to beyond a quarter mile. Since each repeater may also contain a low power FM broadcast band transmitter that also has a severely restricted range, the repeater spacing may be determined by the desired quality of the broadcast band signals to the highway travelers. Each broadcast band transmitter operates on the same frequency and transmits the same audio. The range of each transmitter will need to overlap slightly to avoid signal dropouts to the motorist.

FIG. 8 also indicates reverse transmission links that originate at the repeater at the end of the line. This is a key feature that enables RMT 801 to monitor the status of all repeaters. Since the repeaters may necessarily be located in areas without electrical power, they may rely on batteries to operate. These will typically be rechargeable batteries that use solar cells to recharge them during the day. If some means of checking the status is not provided, a repeater can fail due to a faulty battery, etc. and all subsequent repeaters will shut down. By monitoring the battery voltage in each repeater, the RMT can transmit reliable status information to the CPS when polled. When a battery is about to fail, a technician can be dispatched to replace it before the repeaters shut down. Other parameters may be monitored as well and will be described later.

The status checking is accomplished during a pause in the audio messages. Normally, about 3 to 5 minutes of messages may be constantly repeated over a single RMT. After each set of messages, a one to three second (minimum) pause is inserted. During this pause, all repeaters are checked for problems.

Figure 9:
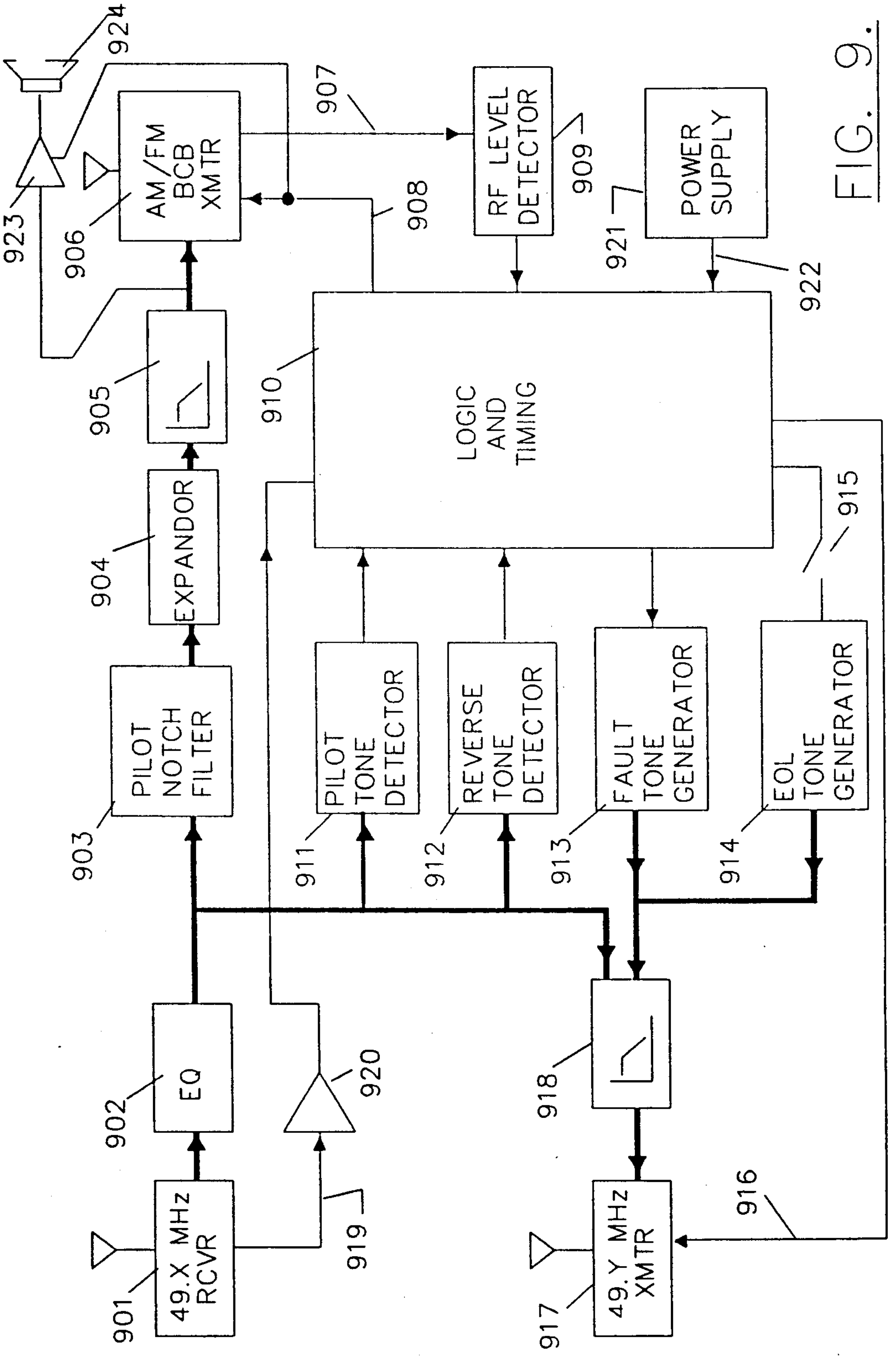
FIG. 9 is a block diagram illustrating a repeater according to the present invention.

FIG. 9 illustrates the basic low power repeater. It receives audio messages from an RMT or other repeater via receiver 901. The audio is passed through equalizer 902 to compensate for some amplitude distortion caused by the radio filters. From there, the audio is routed to various blocks. Block 903 is a notch filter that filters out the pilot tone before the audio is to be broadcast. The pilot tone is simply a low frequency audio signal that identifies the transmission as a valid signal from either an RMT or other repeater. This is a security feature that helps to prevent interfering signals that may share the same radio channel from being broadcast. If cordless phone frequencies are being used for the repeaters, it is possible that a cordless phone in a nearby home may be close enough to interfere with a repeater. If the interfering signal is on the same frequency and is stronger than the desired repeater signal, it will be received, but not broadcast. The audio is muted to transmitter 906 by control line 908.

Block 910 contains logic circuitry that constantly looks at the output of pilot tone detector 911. If the pilot is lost, even due to normal signal fading, control line 908 mutes the audio so that the radio listener does not hear a disturbing noise. The audio is also muted when comparator 920 detects that the received signal has dropped below a preset minimum. Receiver output 919 is a DC voltage proportional to the received signal strength. Timing circuits in block 910 disable transmitter 906 via control line 908 if the pilot tone disappears for more than a preset time that may typically be 20 seconds. This enables the RMT to control all of the transmitters in a repeater string. If a single repeater fails in string, all downstream repeaters would not receive the audio programming, and the downstream transmitters would be disabled until the faulty repeater is repaired.

The pilot tone my also be used to provide synchronization of the clock signals at each repeater so that multiple repeaters in close proximity, broadcasting on the same radio frequency will not produce undesirable interference tones in a receiver. Alternatively, the CPS can provide a synchronization signal every few minutes to maintain clock synchronization at all RMTs.

Expander 904 expands the audio that has previously been compressed before the original transmission at the CPS. The combination of using the compressor and expander acts to minimize the effects of noise that is added during the radio transmissions. Modulator filter 905 limits the bandwidth to the audio message bandwidth to further reduce noise added by the repeater radios.

The audio is also routed to a low power transmitter 917 in the same radio band as the receiver. It does not have to be in the same band, but this is the simplest configuration. Modulation filter 918 is designed to produce very little distortion to the audio signals since the signals may have to pass through ten or more repeaters.

When the repeater is operating in the "forward repeat" mode, where it is repeating signals originated in an RMT, transmitter 917 operates on a radio channel that can be received by a downstream receiver. During a status check sequence in the "reverse repeat" mode, control line 916 causes transmitter 917 to transmit briefly on a frequency that can be received by its adjacent upstream repeater. This status check sequence is caused by RMT during a one to three second minimum pause between messages. First, the pilot tone is turned off to allow the broadcast band transmitters 906 to mute their audio. After about 50 msec, a reverse tone is transmitted by the RMT.

The tone frequency depends on which leg of repeaters is being addressed. Radio "billboards" will normally have only two repeater strings (one on either side of the RMT). Each string is identified or addressed by a tone of a preset frequency in the range of 500 Hz to 2000 KHz. The RMT sequentially checks each repeater string. Reverse tone detector 912 is typically a simple phase-locked loop tone decoder IC that gives a logic level output when it detects a tone of a particular frequency. Internal timing within block 910 determines the next sequences. The tone must be present for about 150 msec minimum to prevent audio messages from accidentally triggering the wrong mode. The pilot tone is received with all valid audio messages anyway, so the probability of a false trigger is almost nonexistent. Block 912 could alternatively use a more complex digital decoder, but the tone encoder/decoder scheme should be the most economical for this application.

After the reverse tone has been detected for 150 msec, control line 916 causes transmitter 917 to switch channels to transmit to the upstream repeater or RMT for a preset time (normally 250 msec). If the repeater is a termination of a string of repeaters, switch 915 is closed to enable the end-of-line (EOL) tone to be generated by generator 914. This is a simply a single tone with a frequency in the passband but different from the frequencies used for reverse mode detection. The EOL tone is passed from the terminating repeater until it reaches the RMT, where it is decoded. If the RMT receives the tone with no other tones present, it proceeds to check other repeater strings or prepares to return to the normal "forward repeat" mode.

Power supply block 921 contains a circuit for checking the battery condition and is monitored by logic within block 910. If the battery is about to fail, the fault tone generator 913 is made to transmit an error tone pair. DTMF tone pairs can be used here to enable the RMT to identify a particular repeater. A digital encoder can be used in block 910 to identify the repeater with a specific ID code, but the circuitry may be more costly without much extra benefit.

If many parameters are being monitored, it would be essential to use a digital encoder to minimize the time required to identify a specific repeater and its problems. FIG. 9 shows that only two conditions are directly monitored in each repeater. Besides the battery or power supply 921, an rf detector 909 is used to monitor the output of the transmitter 906. It the transmitter output drops below a preset minimum power, detector 909 causes logic in block 910 to generate a fault tone with generator 913. A sequence of two to three DTMF tone transmissions may be transmitted to identify the faulty repeater and the specific problem. Normally, just one DTMF tone pair will be required to identify the repeater only.

If the RMT receives the EOL tone with no other tones, all repeaters in the string are functioning properly. The EOL tone may be accompanied by one or more DTMF tone pairs. A problem may exist if a large number of repeaters are used, resulting in a high probability of two or more repeaters transmitting error tones simultaneously. Timing circuits in block 910 can be used to space the error code transmissions to avoid overlapping signals. The RMT can then identify 2 or more faulty repeaters during one status sequence. If the RMT does not detect an EOL tone, one or more repeaters must have failed. A technician can drive by the repeaters to locate the one that failed, since it will be the one not broadcasting or it must be the terminating repeater.

FIG. 9 also illustrates another use for the repeaters as part of an intercom or public address (PA) system. Audio amplifier 923 and loudspeaker 924 allow the audio messages to be audibly broadcast. This may be used as part of a PA system in temporary or outdoor situations where wires would not be convenient to link the remote speakers to a PA system. Another example is if the RMT is used to announce emergency weather conditions in a state or national park. Hikers and campers may be within listening range of one or more remote PA speakers. A public beach may use several repeaters to allow announcements to be heard by swimmers, etc. It may also be used instead of siren type alarms in some situations. If an area must be evacuated due to an emergency, for example because of its proximity to a nuclear power plant accident, audio messages may be broadcast over remote loudspeakers.

Figure 13:
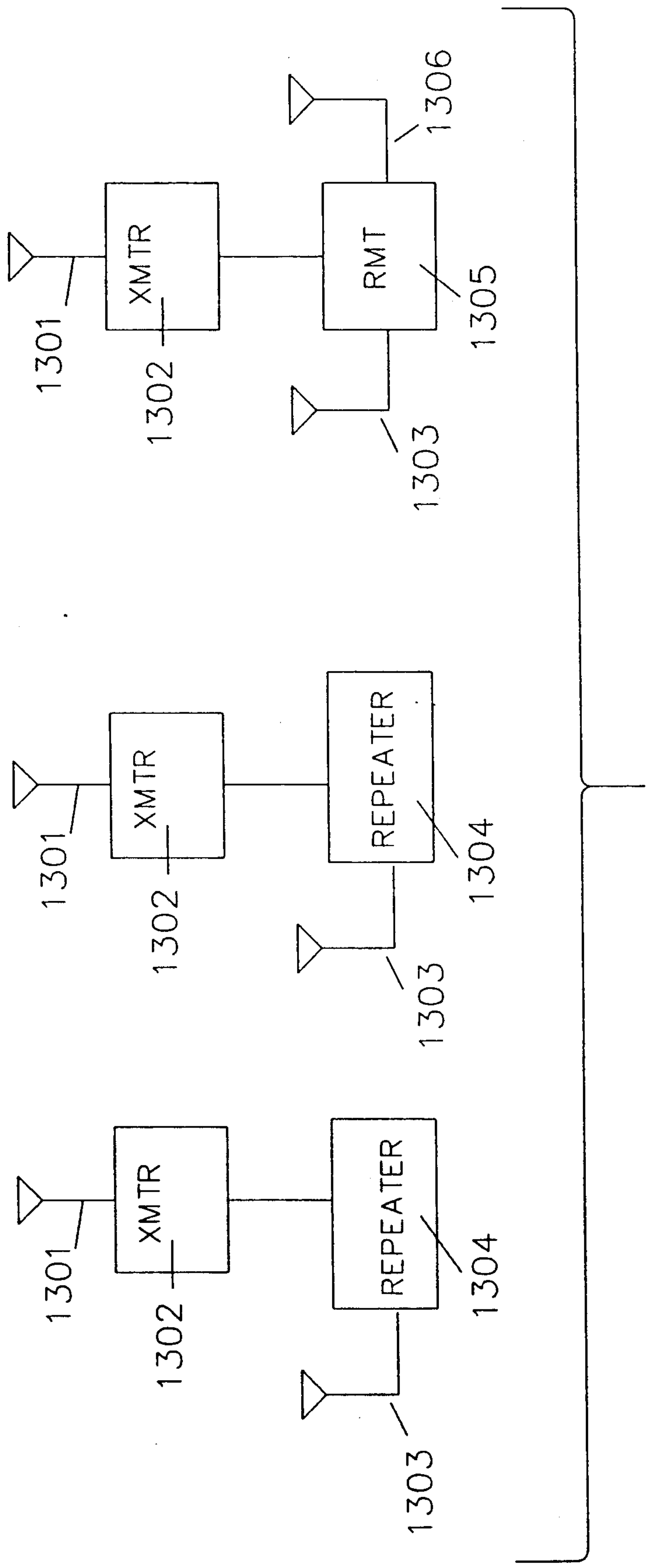
FIG. 13 is a block diagram of an alternate repeater embodiment of the present invention, using repeaters that operate on the same repeater radio channel, but have distinctive access tones or digital codes.

FIG. 13 illustrates an alternate repeater configuration using the same circuits as FIG. 9. The difference is that the RMT 1305 transmits the audio simultaneously to the repeaters 1304 using a single radio channel. This configuration would typically use a licensed radio transmitter for repeaters 1304 and 1305. Radio 1305 may transmit over a UHF or microwave radio link for a distance up to several miles to each repeater 1304. Radio transmitters 1302 broadcast over the same FM broadcast channel, and the repeaters must still be placed close enough to allow the low power signals emanating from antennas 1301 to overlap slightly to provide continuous coverage over an extended range. Each repeater can be addressed and tested during a pause in the audio messages. RMT 1305 may contain another radio to allow the repeater network to be monitored by a CPS.

Figure 10:
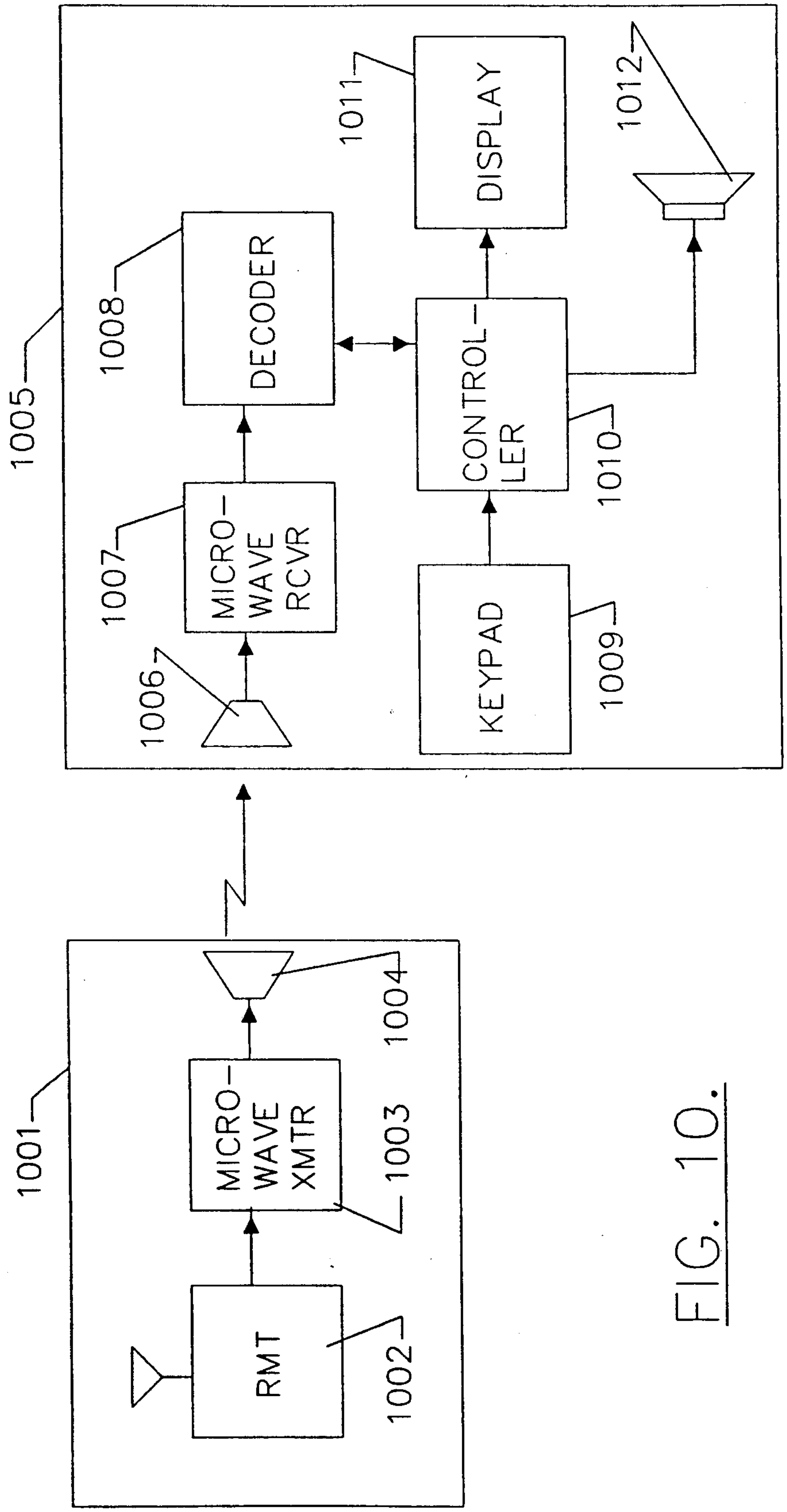
FIG. 10 is a block diagram illustrating an alternate embodiment of the present invention which employs a Remote Message Transmitter to transmit digital information messages to vehicles.

FIG. 10 illustrates an application where an RMT is used to transmit digital information over a low power UHF or microwave radio link to nearby receivers. Block 1001 is a roadside installation containing an RMT 1002 that is programmable from a CPS. Modem 722 of FIG. 7 may be a high speed type that can be used to modulate the carrier of a microwave transmitter 1003 of FIG. 10. The data rate will have to be selected to meet the FCC regulations regarding channel bandwidth. A minimum baud rate of 4800 bits per second will allow approximately 30 to 40 characters to be transmitted per second along with some control and error checking codes. The range of each microwave transmitter will be limited to about $\frac{1}{4}$ to $\frac{1}{2}$ mile. Multiple digital messages can be transmitted in the time it takes for a vehicle to pass the roadside transmitter. An alternate scheme could allow for frequency multiplexing techniques to be employed to increase the number of data channels. Spread spectrum techniques with wideband modulation may be used to maximize data speed and security. Frequencies are available for this type of system using license free transmitters in the 900-MHz radio band. Radio channels can then be categorized so that the motorist can select the type of desired information.

The motorist selects the category of desired information using keypad 1009, which is part of the receiver system 1005 installed in the vehicle. Controller 1010 monitors all data decoded by decoder 1008. If the data being received is the type that is selected, beeper 1012 alerts the driver that the information can be displayed on display 1011. Controller 1010 contains memory to store all transmissions that may be selectively displayed. Also, as new information is received over receiver 1007, old information can be automatically updated.

Figure 11:
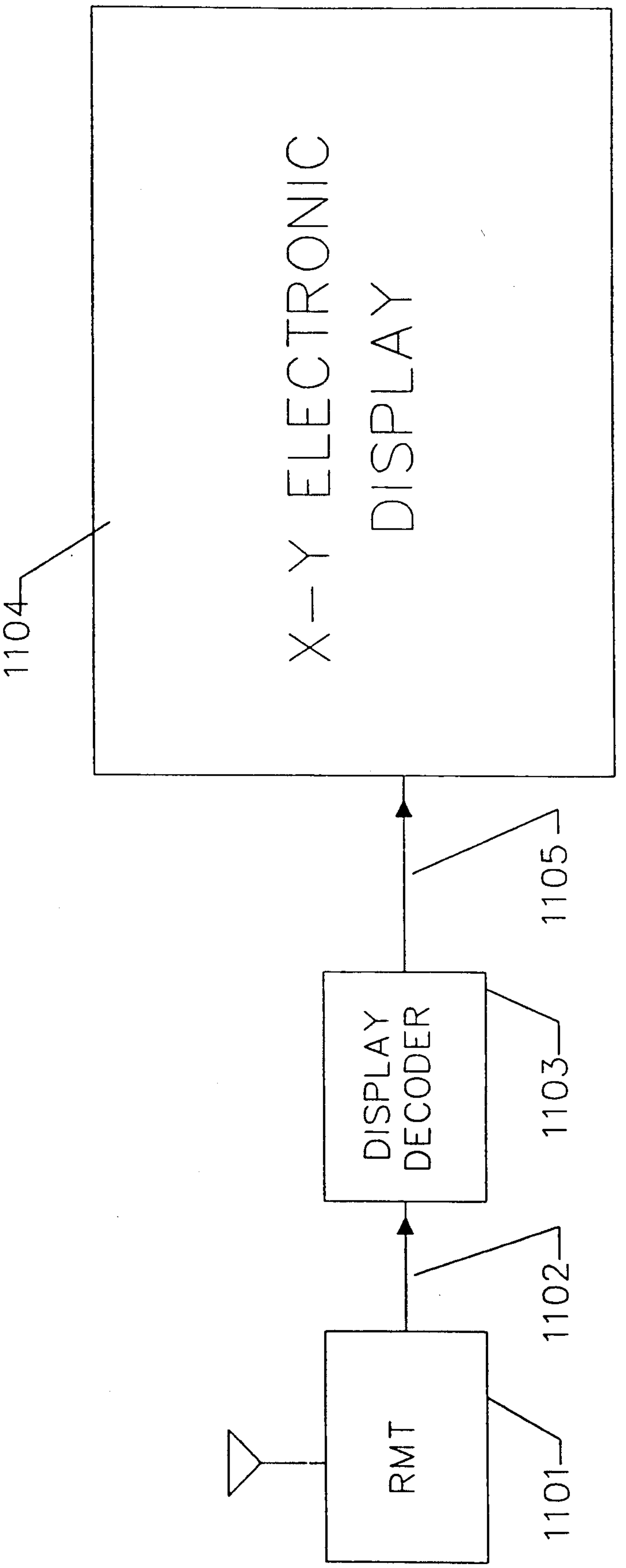
FIG. 11 is a block diagram illustration of a Remote Message Transmitter and an electronic display according to the present invention.

FIG. 11 indicates how an RMT 1101 may be used to program an electronic display 1104. Modem output 1102 can transmit FSK encoded data to display decoder 1103. The decoder may contain a microprocessor based circuit and display driver circuitry that enables it to activate or deactivate individual lights or liquid crystal elements arranged in an X-Y grid pattern. Text and graphics may be displayed so that messages or advertisements may be viewed at great distances. This is an example of a remotely programmable sign or billboard. Messages and pictures may be changed instantaneously to allow multiple advertisements to be placed on a single billboard. The RMT 1101 allows a CPS to program multiple signs over a radio or telephone link. The RMT would also enable the CPS to monitor the status of a remote display.

Another version of the remote message transmitter uses low power AM radio transmitters that are authorized by the FCC to broadcast specific information to highway travelers. Block 713 of FIG. 7 in this case may be a ten watt amplitude-modulated (AM) transmitter licensed to operate in the commercial broadcast band. The range of this transmitter can extend to beyond a mile, so repeaters may not be necessary in many cases. If message lengths require additional range, repeater 714 may extend the range by relaying the audio message to other transmitters just as with the FM transmitter approach already described. The repeater may have to use licensed radios to extend the range up to about two miles between AM transmitters. The repeaters will transmit a pilot tone that will be used to synchronize the carrier frequencies of each remote to the one containing the digital recorder. This will eliminate the possibility of beat notes being detected in receivers within range of two or more co-channel transmitters. Alternately, instead of using repeaters, multiple AM RMT's may be synchronized by the CPS. The CPS would broadcast a sync command every few minutes that would allow internal clocks to synchronize in each RMT. Each RMT may broadcast identical messages, and the messages would be in sync.

One application of the AM RMT is for a state-wide or regional network of travelers aid transmitters that can be controlled, programmed and monitored for malfunctions from a single CPS. A combination of long range radio links, commercial FM subcarrier, and telephone or cellular telephone would allow the range to extend over most areas. Another option would enable a geostationary satellite to relay programming information to RMTs scattered in extremely remote areas all over the country.

Figure 12:
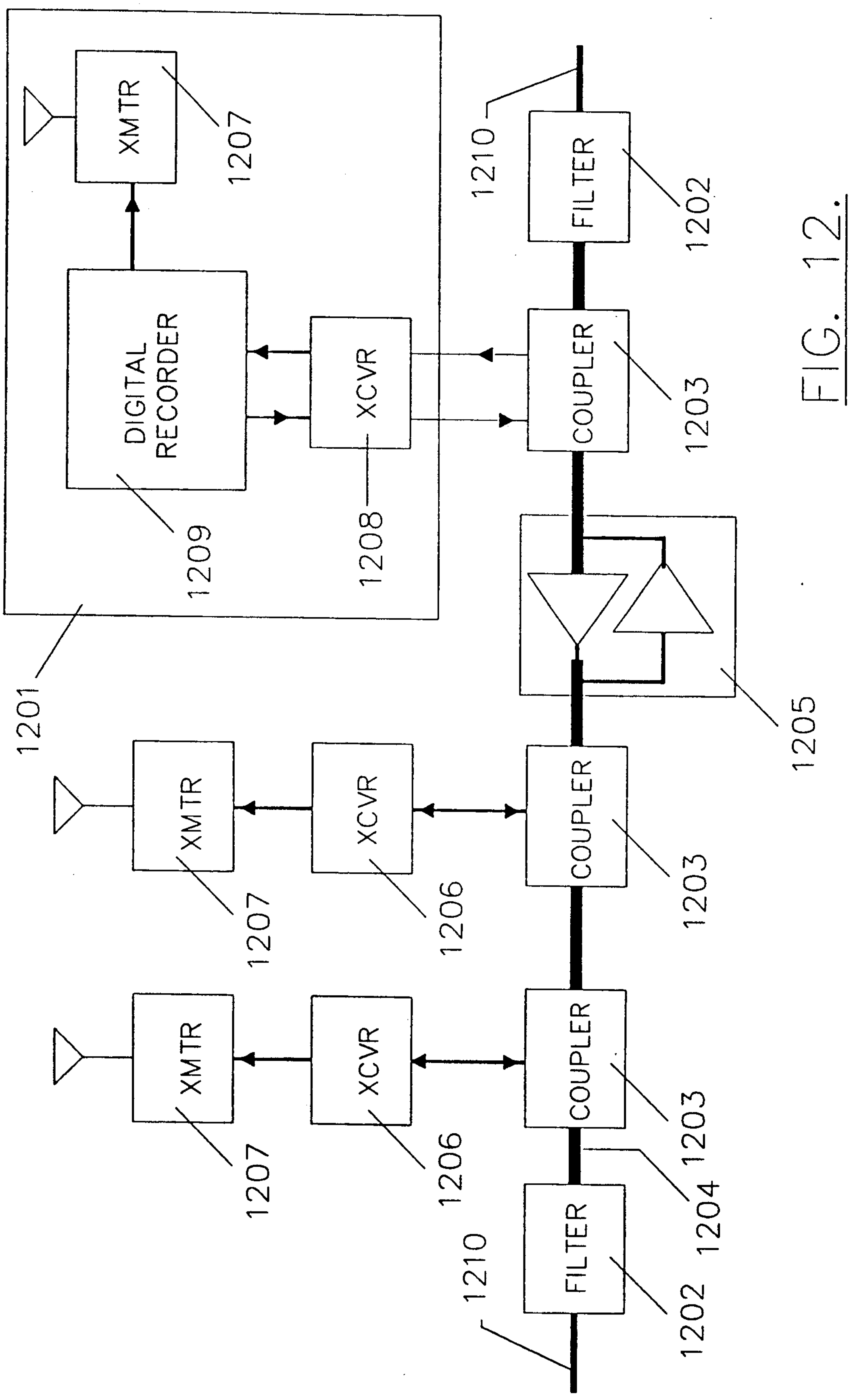
FIG. 12 is a block diagram illustration of a remotely controllable message broadcast system with repeaters, implemented on an existing cable TV system, according to the present invention.

FIG. 12 indicates how RMTs 1201 may be connected to a cable tv system. This would allow an economical means of programming remote message transmitters in an urban area. A cable trunk line 1210 carries a multitude of television signals that originate at a central location. A single cable channel may be used to program hundreds or thousands of remote message transmitters anywhere in the area serviced by the cable system. In the example, messages may be programmed in digital recorder 1209 via radio 1208, which can receive transmissions from the head end on one channel and can allow two-way communication with repeater transceiver 1206 on a separate radio frequency. Low power FM BCB transmitters (1207) broadcast the messages over a limited area. Band reject filters 1202 keep the radio signals used by the repeaters from extending beyond the filters so that multiple repeater systems may use the same frequency without disturbing other repeaters. Blocks 1203 may be signal tap-off couplers or directional couplers that cause minimal disturbance to the cable tv transmission line, but allow signals to be inserted into and extracted from the cable. Block 1205 indicates a line extender or repeater that cable systems use. It may be a two-way type that amplifies one band of frequencies in one direction and another band of frequencies in the other direction. RMT repeater frequencies may have to be chosen to accommodate the existing cable repeater frequencies. For cable systems that have only a one-way repeater system, RMT networks can be placed between cable repeaters.

The advantage of using the programmable RMT and repeater system is that a single frequency may be used to address and program up to thousands of individual transmitter groups. This minimizes the spectrum required for a city-wide low power broadcast band radio information network. Therefore, it minimizes the risk of interference to cable tv signals on the same cable. As with the RMT system programmed by wireless links, certain priority messages may be programmed and broadcast simultaneously over all transmitter groups. Certain commands allow each RMT to store and broadcast messages without having to recognize a valid ID code. This feature may be beneficial for special events or emergency evacuations where a relatively short message can be broadcast continuously throughout a community.

FIG. 12 also illustrates how a coaxial cable may be used to link repeaters to a RMT. The RMT may be programmed via long range radio, but the repeaters may be connected to a coaxial cable. Repeater carrier frequencies may be chosen to be low enough to minimize the signal loss in the cable, but for ranges extending to miles, amplifiers 1205 may be inserted to offset the losses in the cable. The cable may be a coaxial transmission line like that used in cable tv systems or a fiber optic cable as used in telephone systems. For fiber optic links, transceivers 1206 and 1208 would have a suitable interface to allow two-way analog and digital transmission. Unlike telephone systems that use multiple subcarriers to allow a main carrier to handle thousands of voice channels, this application would need only one combination analog/digital channel. Very simple and cost-effective pulse width modulators and demodulators may be used to insert and extract digital commands and audio messages.

Another application of the present invention is an automated weather station. In this application, a set of transducers interfaces to an RMT at the modem port of the RMT. Two-way FSK data allows the RMT to monitor multiple remote transducers. Temperature, wind speed and direction, barometric pressure, etc. may be monitored by an RMT where the RMT continuously broadcasts the readings, updating them constantly. This may be used as part of an automated weather station transmitter, for example, at small airports. The RMT may be programmed with information from the National Weather Service, over a phone line, and local information can be added at the end of the recorded message. External stimuli such as weather data from the transducers may trigger predetermined messages or combine messages with inserted data such as "The ground temperature is X", where X is the inserted measurement. The transmitter may operate on one of the approved aircraft weather beacon channels.

Yet another application of the present invention is an emergency call box system where the primary use of the RMT is to continuously broadcast messages along a highway or in a state or national park. Part of the RMT digital recorder memory may be reserved for emergency messages to be programmed at the RMT to transmit to the CPS. In a highway call box system where hundreds of call boxes may be monitored by radio, sharing a few radio channels, the reliability may be enhanced by storing the emergency message at the callbox temporarily if all the radio channels are busy. When a channel is freed, the RMT can relay the recorded message if the person is not at the call box. The recorder may also be used to format the necessary information before transmitting on the radio channel to minimize the time required to transmit the message. It would also minimize the time required by the emergency operator at the CPS. In this application, the call box would be an RMT with a speaker-phone type interface that would allow audio to be input from a microphone in a box mounted along a highway or in a park, etc. Once contact is initiated with a CPS, the CPS controls the remote call box operation. The call box may be enabled/disabled by commands from the CPS, since unauthorized use may jeopardize legitimate emergencies at other call boxes that share the same radio link to the CPS. This problem may be avoided if telephone or cellular radio links the RMT to the CPS in large systems.

Figure 14A:
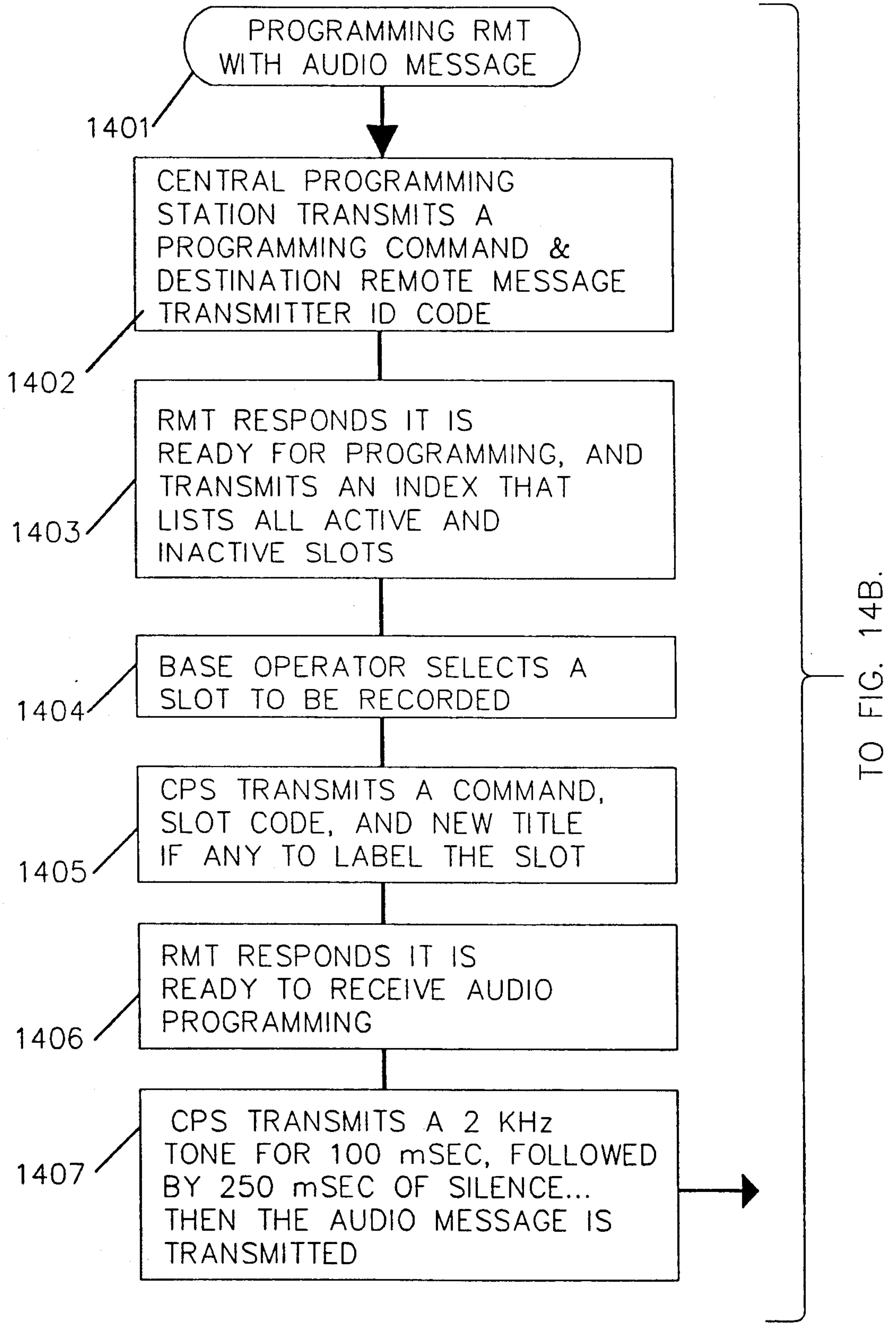
FIG. 14A and 14B is a simplified flow chart representation illustrating a method of programming a Remote Message Transmitter from a Central Programming Station according to the present invention.
Figure 14B:
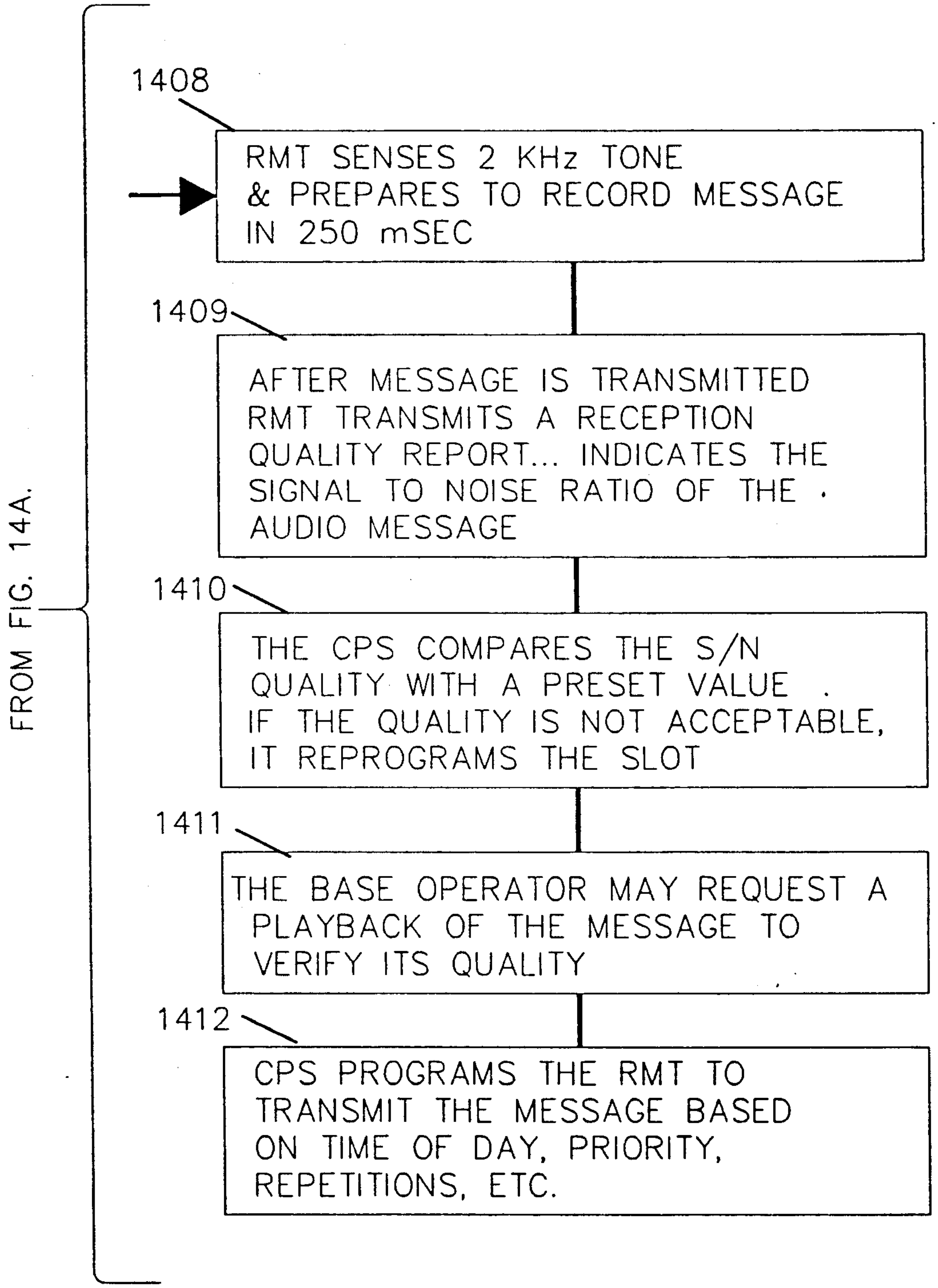

Referring now to FIGS. 14A and 14B, a simplified flow chart representation illustrating a method of programming an RMT from a CPS according to the present invention is shown. FIGS. 14A and 14B illustrates that handshaking commands between the CPS and RMT provide proper synchronization and programming. In the example of FIGS. 14A and 14B, a slot is selected and programmed with an audio message without interrupting broadcast transmissions from the RMT. Since the signal quality of the recorded message may be degraded by noise due to radio propagation, fading, or atmospheric absorption or other factors, the example illustrates that the signal to noise ratio is monitored in the RMT. If the signal to noise ratio has degraded below a preset threshold, it may cause the CPS to either sound an alarm or automatically reprogram the slot. Most messages will be of short duration, and if there is no equipment failure, only one more try will be required for acceptable signal quality.

Referring now to FIG. 14A programming of an RMT with an audio message, (block 1401) begins when the CPS transmits a programming command and destination RMT ID code (block 1402). The RMT ID code corresponds to the address of the RMT which it is desired to program. At block 1403, the RMT having an address equal to the transmitted address responds that it is ready for programming, and transmits an index that lists all of its active and inactive slots. Then, at block 1404, the base operator at the CPS selects a slot to be recorded. The CPS then transmits a command, slot code, and new title if any to label the slot at block 1405. The RMT then responds at block 1406 that it is ready to receive the audio programming. At block 1407, the CPS transmits a 2 kilohertz tone for 100 milliseconds, followed by 250 milliseconds of silence. Then the audio message is transmitted.

At block 1408, FIG. 14B, the RMT senses the two kilohertz tone and prepares to record the message during the 250 milliseconds of silence. The RMT then records the message as it is transmitted. After the message is transmitted (block 1409), the RMT transmits a reception quality report which indicates the signal-to-noise radio of the audio message. At block 1410, the CPS compares the signal to noise ratio with a preset value. If the quality is not acceptable, an alarm may be sounded or the CPS may automatically reprogram that slot. At block 1411, the base operator of the CPS may request a playback of the message to verify its quality. Once the message has been placed in the appropriate RMT, the CPS may program the RMT to transmit the new message based on time of day, priority, repetitions or other criteria, at block 1412.

Figure 15:
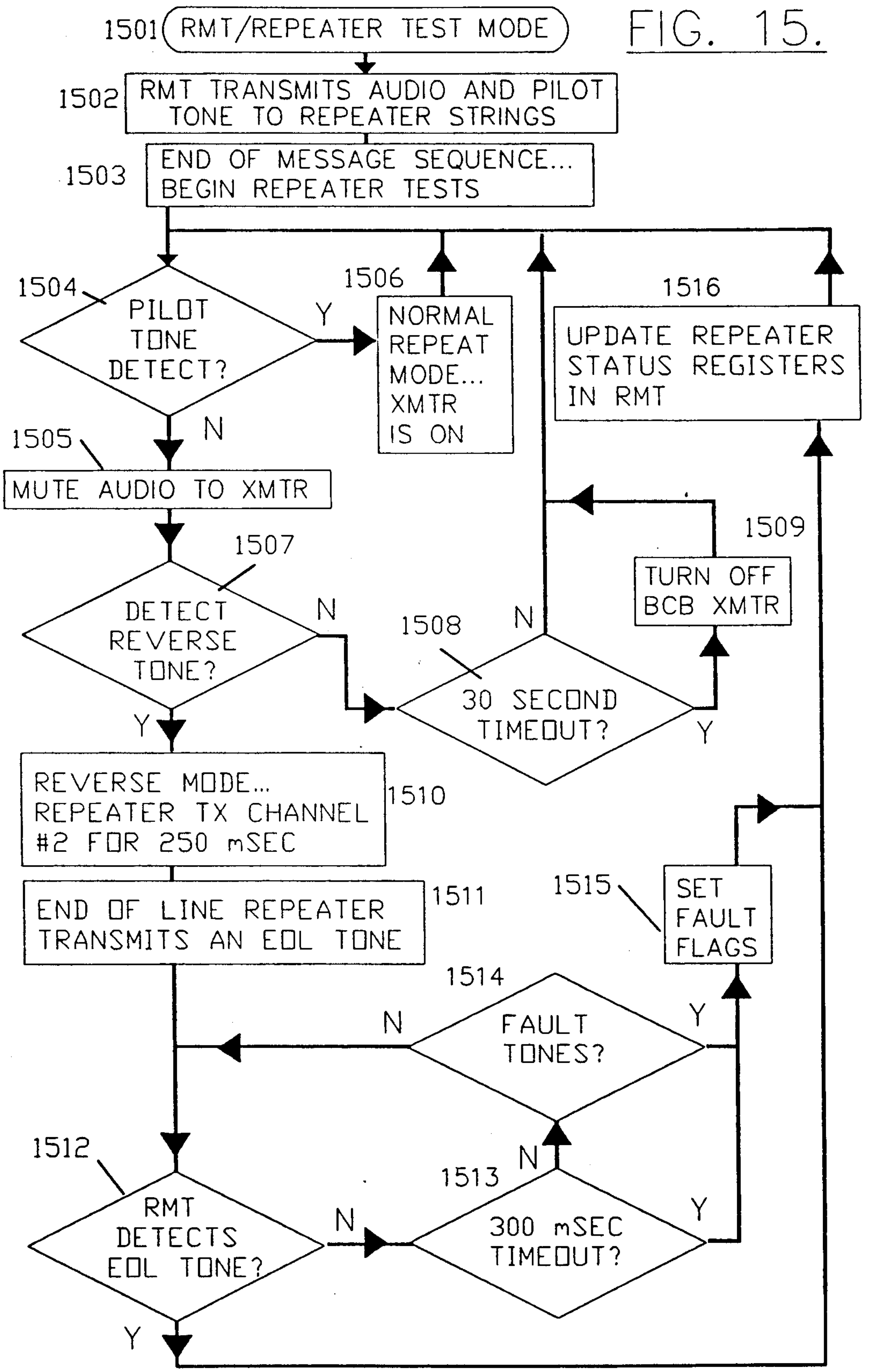
FIG. 15 is a simplified flow chart representation illustrating a method of fault testing repeaters according to the present invention.

Referring now to FIG. 15, a simplified flow chart representation illustrating the method of fault testing repeaters during a pause between audio messages according to the present invention is shown. FIG. 15 illustrates how a single repeater string may be checked for malfunctions due to equipment failure, discharged batteries, broken antennas or other faults. Fault testing is an essential feature of the present invention because a CPS may be located miles from RMT and the RMT may use a string of repeaters extending for several miles. In order to provide the highest system of reliability, each repeater in the system may be checked automatically without interrupting the messages being broadcast. As illustrated in FIG. 15, checking may be performed by using tone generators and detectors, in which the RMT transmits a pilot tone and each repeater is able to detect the tone. When the tone is detected, the repeater enables its low power broadcast band transmitter to transmit and the repeater string operates in the normal direction, i.e. extending away from the RMT. When the pilot tone is turned off, the audio is muted to the low power broadcast band transmitter to prevent the testing tones from being broadcast.

Referring now to FIG. 15, the RMT/repeater test mode (block 1501) begins when the RMT transmits a pilot tone to its repeater strings (block 1502). At the end of a message sequence, the repeater tests begin at block 1503. At block 1504 the each repeater tests for detection of a pilot tone. If the pilot tone is detected, then the repeater continues its normal repeat mode by maintaining its low power transmitter on. On the other hand, if a pilot tone is not detected at block 1504, then the audio is muted to the low power transmitter so that the test tones are not transmitted (block 1505). The repeater then looks for a reverse tone at block 1507. If the reverse tone is not detected within a 30 second timeout (block 1508), then the repeater continues to look for the pilot tone (block 1504). On the other hand, if a 30 second timeout has elapsed, then the repeater transmitter is turned off and the repeater stops transmitting.

Referring again to block 1507, if the reverse tone is detected, then the repeater transmits back in reverse mode for 250 milliseconds (block 1510), and the end of line repeater transmits an EOL tone at block 1511. If the RMT detects the EOL tone (block 1512) then the repeater status registers at the RMT are updated at block 1516. On the other hand, if the RMT does not detect the EOL tone within a 300 millisecond time period (block 1513), or the RMT detects the fault tones within the 300 millisecond time period (block 1514), fault flags are set at block 1515 and the repeater status registers are updated at block 1516 to indicate a fault.

As illustrated in FIG. 15, 300 milliseconds is required to test a repeater string. In many systems, two repeater strings are used so that it only takes about 0.6 seconds to check the status of all repeaters in the network. It will be understood by those having skill in the art that the repeater testing method of FIG. 15 employs simple tone generators, however multitone generators and detectors or digital encoders/decoders may be employed to perform these testing functions in a shorter time period. As shown in FIG. 15, the status register is updated after each test (block 1516). This status register is then used to transmit the network status to a CPS during a status poll or alarm transmission as has been previously described.

In the drawings and specification, there have been disclosed typical preferred embodiments of the invention and, although specific terms are employed, they are used in a generic and descriptive sense only and not for purposes of limitation, the scope of the invention being set forth in the following claims.

That which I claim is:

1. A remotely controllable message broadcast system comprising:

a central programming station, a plurality of remote message transmitters and a plurality of repeaters;

said central programming section comprising:

means for storing therein a library of broadcast messages and a set of remote message transmitter programming instructions; and means for transmitting selected broadcast messages from said library and selected remote message transmitter programming instructions from said set to said plurality of remote message transmitters upon receipt of an external stimulus;

each of said plurality of remote message transmitters comprising:

means for receiving said selected broadcast messages and said selected remote message transmitter programming instructions from said central programming station;

means for storing therein a subset of said selected broadcast messages and a subset of said selected remote message transmitter programming instructions based upon predetermined selection criteria; and means for locally transmitting at least one of the subset of said selected broadcast messages, in a predetermined sequence under control of the subset of said selected remote transmitter programming instructions stored therein;

each of said plurality of repeaters being associated with one of said plurality of remote message transmitters and being located to receive the locally transmitted at least one of the subset of said selected broadcast messages, each of said plurality of repeaters comprising:

means for receiving the locally transmitted at least one of the subset of said selected broadcast messages from an associated remote message transmitter; and means for locally retransmitting the received locally transmitted at least one of the subset of said selected broadcast messages from the associated remote message transmitter;

whereby different sequences of messages from said library are broadcast in different local coverage areas of said remote message transmitters, under remote control of said central programming station.

2. The remotely controllable message broadcast system of claim 1 wherein said central programming station further comprises means for monitoring operational status of said plurality of remote message transmitters.

3. The remotely controllable message broadcast system of claim 2 wherein said means for monitoring comprises means for successively polling each of said plurality of remote message transmitters to obtain operational status information from each of said remote message transmitters.

4. The remotely controllable message broadcast system of claim 2 wherein said means for monitoring comprises means for receiving alarms from said remote message transmitters upon occurrence of a fault condition therein.

5. The remotely controllable message broadcast system of claim 1 wherein said means for transmitting selected broadcast messages comprises long range transmission means capable of transmitting said selected broadcast messages to each of said plurality of remote message transmitters.

6. The remotely controllable message broadcast system of claim 5 where said long range transmission means is selected from the group consisting of a licensed radio link, a cellular telephone link, a licensed FM transmitter, a cable television system, an optical fiber link, and a commercial broadcast station subcarrier.

7. The remotely controllable message broadcast system of claim 1 wherein the external stimulus is selected from the group consisting of an externally generated programming command, occurrence of a predetermined time, and manual triggering of said transmitting means.

8. The remotely controllable message broadcast system of claim 1 wherein said selected remote message transmitter programming instructions comprise global programming commands for execution by all of said plurality of remote message transmission units and addressable programming commands for programming an individual one of said remote message transmitters.

9. The remotely controllable message broadcast system of claim 8 wherein said predetermined selection criteria comprise a unique address for each of said remote message transmitters, and wherein said means for storing therein a subset of said selected broadcast messages and said selected remote transmitter programming instructions comprises means for storing therein global programming commands and means for storing therein addressable programming commands having an address which corresponds to said unique address for an associated remote message transmitter.

10. The remotely controllable message broadcast system of claim 1 wherein said library of broadcasting messages include audio messages.

11. The remotely controllable message broadcast system of claim 1 wherein said library of broadcast messages include digital information messages.

12. The remotely controllable message broadcast system of claim 1 wherein said means for storing therein a library of broadcast messages and a set of remote message transmitter programming instructions comprises: a digital audio tape machine for storing therein a library of broadcast messages, and a random access memory for storing therein a set of remote message transmitter programming instructions.

13. The remotely controllable message broadcast system of claim 1 wherein said means for transmitting selected broadcast messages from said library comprises a digital recorder having a predetermined number of message recording slots therein, with each slot having a predetermined message length; means for formatting the selected broadcast messages from said library into appropriate ones of said message recording slots; and means for transmitting messages from selected ones of said message recording slots.

14. The remotely controllable message broadcast system of claim 13 wherein said means for storing therein a subset of said selected broadcast messages comprises a digital recorder having said predetermined number of message slots; and means for storing therein the subset of said selected broadcast messages in said appropriate ones of said message slots.

15. The remotely controllable message broadcast system of claim 1 wherein the means for storing therein a subset of said selected broadcast messages comprises a digital recorder/player adapted to simultaneously record and play broadcast messages, whereby said at least one of the subset of said selected broadcast messages may be locally transmitted at the same time the subset of said selected broadcast messages are stored therein, to provide uninterrupted local transmission of broadcast messages.

16. The remotely controllable message broadcast system of claim 15 wherein said digital recorder/player comprises:

a random access memory;

first and second coder/decoders connected to said random access memory;

said first coder/decoder including means for sampling a received broadcast message, means for digitizing the sampled received broadcast message, and means for storing the digitized received broadcast message at a first predetermined address in said random access memory;

said second coder/decoder including means for reading a received broadcast message from a second predetermined address in said random accessory memory, and means for converting the contents of said second predetermined address into an analog signal;

said means for storing the digitized received broadcast message and said means for reading a received broadcast message being arranged to operate during successive time intervals, whereby simultaneous storage of received broadcast messages and transmission of stored broadcast messages may occur.

17. The remotely controllable message broadcast system of claim 1 wherein said means for locally transmitting is selected from the group consisting of a license free transmitter and a license transmitter for transmitting over a predetermined local area.

18. The remotely controllable message broadcast system of claim 1 wherein said means for locally transmitting comprises a loudspeaker for transmitting over a predetermined local area.

19. The remotely controllable message broadcast system of claim 1 wherein the means for locally transmitting comprises an electronic billboard for displaying messages thereon.

20. The remotely controllable message broadcast system of claim 1 wherein said means for locally retransmitting is selected from the group consisting of a license free transmitter and a licensed transmitter for transmitting over a predetermined local area.

21. The remotely controllable message broadcast system of claim 1 wherein said means for locally retransmitting comprises a loudspeaker for transmitting over a predetermined local area.

22. The remotely controllable message broadcast system of claim 1 wherein said means for locally retransmitting comprises an electronic billboard for displaying messages thereon.

23. The remotely controllable message broadcast system of claim 1 wherein said plurality of remote message transmitters are located along at least one highway to provide a remotely controllable highway advisory radio system.

24. The remotely controllable message broadcast system of claim 1 wherein a respective remote message transmitter and its associated repeaters are located adjacent a respective highway exit, to provide unique advisory information for each highway exit.

25. The remotely controllable message broadcast system of claim 24 wherein each of said remote message transmitters and its associated repeaters operate at an identical broadcast frequency, whereby unique highway advisory information may be received at each respective highway exit at said identical broadcast frequency.

26. The remotely controllable message broadcast system of claim 24 wherein a first remote message transmitter and its associated repeaters are located adjacent a highway exit along a first direction of traffic flow and a second remote message transmitter and its associated repeaters are located adjacent said highway exit along a second direction of traffic flow, said first remote message transmitter and its associated repeaters broadcasting at a first broadcast frequency and said second remote message transmitter and its associated repeaters broadcasting at a second broadcast frequency, whereby unique highway advisory messages may be received along said first direction at said first broadcast frequency, and along said second direction at said second broadcast frequency.

27. The remotely controllable message broadcast system of claim 1 wherein said means for locally transmitting comprises a license free transmitter for locally transmitting selected ones of said at least one of the subset of said selected broadcast messages at a first radio frequency and for locally transmitting selected ones of said at least one of the subset of said selected broadcast messages at a second radio frequency; and wherein said plurality of repeaters comprises a first repeater and a second repeater, said first repeater being located to receive the locally transmitted at least one of the subset of said selected broadcast messages at said first frequency and said second repeater being located to receive the locally transmitted at least one of the subset of said selected broadcast messages at said second frequency, whereby one remote message transmitter may locally transmit messages at said first and second frequencies, respectively.

28. The remotely controllable message broadcast system of claim 1 wherein a respective remote message transmitter and its associated repeaters are located adjacent a highway, each of said remote message transmitters further comprising traffic detecting means for detecting vehicular traffic along the highway, and means, responsive to said traffic detecting means, for triggering said means for locally transmitting at least one of the subset of said selected broadcast messages upon detecting vehicular traffic.

29. The remotely controllable message broadcast system of claim 1 wherein said means for receiving selected broadcast messages and said selected remote message transmitter programming instructions from said central programming station further comprises: means for monitoring the quality of the received messages and instructions from said central programming station, and means, responsive to said monitoring means, for indicating to said central programming station that a low quality transmission of messages and instructions has occurred.

30. The remotely controllable message broadcast system of claim 1 further comprising means for receiving external stimuli at said plurality of remote message transmitters, and wherein said means for locally transmitting comprises means for locally transmitting at least one of the stored broadcast messages under control of the remote transmitter programming instructions and the received external stimuli.

31. The remotely controllable message broadcast system of claim 29 wherein said central programming station further comprises means for retransmitting said selected broadcast messages and programming instructions via said transmitting means, upon receipt of an indication from a remote message transmitter that a low quality transmission of messages and instructions has occurred.

32. The remotely controllable message broadcast system of claim 1 wherein said means for locally transmitting operates continuously, to continuously transmit said at least one of the subset of said selected broadcast messages in the predetermined continuous sequence.

33. The remotely controllable message broadcast system of claim 1 wherein each of said means for locally transmitting operates at a first transmission frequency.

34. The remotely controllable message broadcast system of claim 1 wherein each of said plurality of remote message transmitters further comprises means for monitoring operational status of its associated repeaters.

35. The remotely controllable message broadcast system of claim 34 wherein each of said means for monitoring operational status comprises means for monitoring the battery voltage of its associated repeaters.

36. The remotely controllable message broadcast system of claim 1 wherein said means for locally transmitting comprises means for locally transmitting at least one of the subset of said selected broadcast messages, superimposed upon a pilot tone.

37. The remotely controllable message broadcast system of claim 1 wherein said library of broadcast messages comprise digital information messages, said remotely controllable message broadcast system further comprising a plurality of digital message receivers, each comprising:

means for receiving the locally retransmitted at least one of the subset of the selected broadcast messages from an associated repeater; and means for displaying the received locally retransmitted at least one of the subset of the selected broadcast messages.

38. The remotely controllable message broadcast system of claim 37 wherein each of said plurality of digital message receivers further comprises:

means, responsive to said means for receiving the locally retransmitted at least one of the subset of the selected broadcast messages, for selecting a predetermined locally retransmitted at least one of the subset of the selected broadcast messages for display on said displaying means.

39. The remotely controllable message broadcast system of claim 38 wherein said means for selecting includes a keyboard.

40. The remotely controllable message broadcast system of claim 37 wherein said plurality of digital message receivers further comprises:

means for providing an alert in response to said predetermined locally retransmitted at least one of the subset of the selected broadcast messages being received by said receiving means of said digital message receiver.

41. The remotely controllable message broadcast system of claim 7 wherein said manual triggering of said transmitting means is initiated by at least one of the group consisting of a telephone, a radio, and a keyboard.

42. The remotely controllable message broadcast system of claim 1 wherein said subset of said selected remote transmitter programming instructions stored in said means for locally transmitting controls the local transmission of the at least one of the subset of said selected broadcast messages at predetermined times of the day.

43. The remotely controllable message broadcast system of claim 2 wherein said means for monitoring operational status of said plurality of remote message transmitters comprises means for monitoring the quality of the locally transmitted at least one of the subset of said selected broadcast messages and means for monitoring the quality of the received selected broadcast messages.

44. The remotely controllable message broadcast system of claim 1 wherein each of said plurality of remote message transmitters further comprises rechargeable battery means for supplying electrical power to said receiving means, said storing means and said locally transmitting means thereof.

45. The remote controllable message broadcast system of claim 44 wherein said rechargeable battery means comprises solar rechargeable means.

46. The remotely controllable message broadcast system of claim 1 wherein each of said plurality of repeaters further comprises rechargeable battery means for supplying electrical power to said receiving means and said locally retransmitting means thereof.

47. The remotely controllable message broadcast system of claim 46 wherein said rechargeable battery means comprises solar rechargeable battery means.

48. The remotely controllable message broadcast system of claim 15 wherein said digital recorder/player is selected from the group consisting of a digital audio tape recorder/player and an erasable optical disk.

49. The remotely controllable message broadcast system of claim 16 wherein said random access memory is addressable.

50. The remotely controllable message broadcast system of claim 16 wherein said random access memory is formatted into a plurality of message slots.

51. The remotely controllable message broadcast system of claim 50 wherein each of said plurality of message slots has a predetermined starting address and ending address associated therewith.

52. The remotely controllable message broadcast system of claim 50 wherein said set of remote message transmitter instructions includes at least one message slot identifying instruction for identifying the message slot for storing a broadcast message therein.

53. The remotely controllable message broadcast system of claim 1 wherein said set of remote message transmitter programming instructions includes at least one instruction for formatting said means for storing therein a subset of said selected broadcast messages.

54. The remotely controllable message broadcast system of claim 1 wherein said central programming station further comprises means responsive to said storing means of said central programming station for storing therein an index of the library of broadcast messages, and wherein said remote message transmitters further comprises means, responsive to said storing means of said remote message transmitter, for storing therein an index of the subset of said selected broadcast messages.

55. The remotely controllable message broadcast system of claim 1 wherein said set of remote message transmitter programming instructions includes at least one instruction for defining said predetermined sequence.

56. The remotely controllable message broadcast system of claim 1 wherein said set of remote message transmitter programming instructions includes at least one instruction for determining the number of repetitions of a predetermined one of said broadcast messages.

57. The remotely controllable message broadcast system of claim 1 wherein said set of remote message transmitter programming instructions includes at least one instruction for defining a priority for locally transmitting said at least one of the subset of said selected broadcast messages.

58. The remotely controllable message broadcast system of claim 1 wherein said set of remote message transmitter instructions includes at least one instruction for defining a start and a stop time for said at least one of the subset of said selected broadcast messages.

59. The remotely controllable message broadcast system of claim 1 wherein said means for locally transmitting at least one of the subset of said selected broadcast messages further comprises means for inserting a gap between said at least one of said selected broadcast messages in said predetermined sequence during local transmission of said at least one of said selected broadcast messages by said locally transmitting means.

60. The remotely controllable message broadcast system of claim 17 wherein said license free transmitter is selected from the group consisting of a license free radio transmitter and a license free microwave transmitter.

61. The remotely controllable message broadcast system of claim 20 wherein said license free transmitter is selected from the group consisting of a license free radio transmitter and a license free microwave transmitter.

62. A remotely controllable message broadcast system comprising:

a central programming station and a plurality of remote message transmitters;

said central programming station comprising:

means for storing therein a library of broadcast messages and a set of remote message transmitter programming instructions; and means for transmitting selected broadcast messages from said library and selected remote message transmitter programming instructions from said set to said plurality of remote message transmitters upon receipt of an external stimulus;

each of said plurality of remote message transmitters comprising:

means for receiving said selected broadcast messages and said selected remote message transmitter programming instructions from said central programming station;

means for storing therein a subset of said selected broadcast messages and a subset of said selected remote message transmitter programming instructions based upon predetermined selection criteria; and means for locally transmitting at least one of the subset of said selected broadcast messages, in a predetermined sequence under control of the subset of said selected remote transmitter programming instructions stored therein;

whereby different sequences of messages from said library are broadcast in different local coverage areas of said remote message transmitters, under remote control of said central programming station.

63. The remotely controllable message broadcast system of claim 62 wherein said central programming station further comprises mean for monitoring operational status of said plurality of remote message transmitters.

64. The remotely controllable message broadcast system of claim 63 wherein said means for monitoring comprises means for successively transmitting polling messages to each of said plurality of remote message transmitters to obtain operational status information from each of said remote message transmitters.

65. The remotely controllable message broadcast system of claim 63 wherein said means for monitoring comprises means for receiving alarms from said remote message transmitters upon occurrence of a fault condition therein.

66. The remotely controllable message broadcast system of claim 62 wherein said means for transmitting selected broadcast messages comprises long range transmitting means, for transmitting said selected broadcast messages to each of said plurality of remote message transmitters.

67. The remotely controllable message broadcast system of claim 66 where said long range transmission means is selected from the group consisting of a licensed radio link, a cellular telephone link, a licensed FM transmitter, a cable television system, an optical fiber link, and a commercial broadcast station subcarrier.

68. The remotely controllable message broadcast system of claim 62 wherein the external stimulus is selected from the group consisting of an externally generated programming command, occurrence of a predetermined time, and manual triggering of said transmitting means.

69. The remotely controllable message broadcast system of claim 62 wherein said selected remote message transmitter programming instructions comprise global programming commands for execution by all of said plurality of remote message transmission units and addressable programming commands for programming an individual one of said remote message transmitters.

70. The remotely controllable message broadcast system of claim 69 wherein said predetermined selection criteria comprises a unique address for each of said remote message transmitters, and wherein said means for storing therein a subset of said selected broadcast messages and said selected remote transmitter programming instructions comprises means for storing therein global programming commands and means for storing therein addressable programming commands having an address which corresponds to said unique address for an associated remote message transmitter in response to said means for receiving said selected broadcast messages and said selected remote message transmitter programming instructions from said central programming station.

71. The remotely controllable message broadcast system of claim 62 wherein said library of broadcasting messages include audio messages.

72. The remotely controllable message broadcast system of claim 62 wherein said library of broadcast messages include digital information messages.

73. The remotely controllable message broadcast system of claim 62 wherein said means for storing therein a library of broadcast messages and a set of remote message transmitter programming instructions comprises: a digital audio tape machine for storing a library of broadcast messages, and a random access memory for storing therein a set of remote message transmitter programming instructions.

74. The remotely controllable message broadcast system of claim 62 wherein said means for transmitting selected broadcast messages from said library comprises a digital recorder having a predetermined number of message recording slots therein, with each slot having a predetermined message length; means for formatting the selected broadcast messages from said library into appropriate ones of said message recording slots; and means for transmitting messages from selected ones of said message recording slots via said means for transmitting selected broadcast messages.

75. The remotely controllable message broadcast system of claim 74 wherein said means for storing therein a subset of said selected broadcast messages comprises a digital recorder having said predetermined number of message slots; and means for storing therein the subset of said selected broadcast messages in said appropriate ones of said message slots.

76. The remotely controllable message broadcast system of claim 62 wherein the means for storing therein a subset of said selected broadcast messages comprises a digital recorder/player adapted to simultaneously record and play broadcast messages, whereby said at least one of the subset of said selected broadcast messages may be locally transmitted at the same time the subset of said selected broadcast messages are stored therein, to provide uninterrupted local transmission of broadcast messages.

77. The remotely controllable message broadcast system of claim 76 wherein said digital recorder/player comprises:

a random access memory;

first and second coder/decoders connected to said random access memory;

said first coder/decoder including means for sampling a received broadcast message, means for digitizing the sampled received broadcast message, and means for storing the digitized received broadcast message at a first predetermined address in said random access memory;

said second coder/decoder including means for reading a received broadcast message from a second predetermined address in said random accessory memory, and means for converting the contents of said second predetermined address into an analog signal;

said means for storing the digitized received broadcast message and said means for reading a received broadcast message being arranged to operate during successive time intervals, whereby simultaneous storage of received broadcast messages and transmission of stored broadcast messages may occur.

78. The remotely controllable message broadcast system of claim 62 wherein said means for locally transmitting is selected from the group of a license free transmitter and a licensed transmitter for transmitting over a predetermined local area.

79. The remotely controllable message broadcast system of claim 62 wherein said means for locally transmitting comprises a loudspeaker for transmitting over a predetermined local area.

80. The remotely controllable message broadcast system of claim 62 wherein the means for locally transmitting comprises an electronic billboard for displaying messages thereon.

81. The remotely controllable message broadcast system of claim 62 wherein said plurality of remote message transmitters are located along at least one highway to provide a remotely controllable highway advisory radio system.

82. The remotely controllable message broadcast system of claim 62 wherein a respective remote message transmitter is located adjacent a respective highway exit, to provide unique advisory information for each highway exit.

83. The remotely controllable message broadcast system of claim 82 wherein each of said remote message transmitters and its associated repeaters operate at an identical broadcast frequency, whereby unique highway advisory information may be received at each respective highway exit at said identical broadcast frequency.

84. The remotely controllable message broadcast system of claim 82 wherein a first remote message transmitter is located adjacent a highway exit along a first direction of traffic flow and a second remote message transmitter is located adjacent said highway exit along a second direction of traffic flow, said first remote message transmitter broadcasting at a first broadcast frequency and said second remote message transmitter broadcasting at a second broadcast frequency, whereby unique highway advisory messages may be received along said first direction at said first broadcast frequency, and along said second direction at said second broadcast frequency.

85. The remotely controllable message broadcast system of claim 62 wherein said means for locally transmitting comprises a license free transmitter for locally transmitting selected ones of said at least one of the subset of said selected broadcast messages at a first radio frequency and for locally transmitting selected ones of said at least one of the subset of said selected broadcast messages at a second radio frequency; whereby one remote message transmitter may locally transmit messages at said first and second frequencies, respectively.

86. The remotely controllable message broadcast system of claim 62 wherein a respective remote message transmitter is located adjacent a highway, each of said remote message transmitters further comprising: traffic detecting means for detecting vehicular traffic along the highway, and means, responsive to said traffic detecting means, for triggering said means for locally transmitting at least one of the subset of said selected broadcast messages upon detecting vehicular traffic.

87. The remotely controllable message broadcast system of claim 62 wherein said means for receiving selected broadcast messages and said selected remote message transmitter programming instructions from said central programming station further comprises: means for monitoring the quality of the received messages and instructions from said central programming station, and means, responsive to said monitoring means for indicating to said central programming station that a low quality transmission of messages and instructions has occurred.

88. The remotely controllable message broadcast system of claim 62 further comprising means for receiving external stimuli at said plurality of remote message transmitters, and wherein said means for locally transmitting comprises means for locally transmitting at least one of the stored broadcast messages under control of the remote transmitter programming instructions and the received external stimuli.

89. The remotely controllable message broadcast system of claim 87 wherein said central programming station further comprises means for retransmitting said selected broadcast messages and programming instructions via said transmitting means, upon receipt of an indication from a remote message transmitter that a low quality transmission of messages and instructions has occurred.

90. The remotely controllable message broadcast system of claim 62 wherein said means for locally transmitting operates continuously, to continuously transmit said at least one of the subset of said selected broadcast messages in the predetermined continuous sequence.

91. The remotely controllable message broadcast system of claim 62 wherein each of said means for locally transmitting operates at a first transmission frequency.

92. The remotely controllable message broadcast system of claim 62 wherein said means for locally transmitting comprises means for locally transmitting at least one of the subset of said selected broadcast messages, superimposed upon a pilot tone.

93. The remotely controllable message broadcast system of claim 72 wherein said library of broadcast messages comprise digital information messages, and remotely controllable message broadcast system further comprising a plurality of digital message receivers, each comprising:

means for receiving the locally transmitted at least one of the subset of the selected broadcast messages from an associated remote message transmitter; and means for displaying the received locally retransmitted at least one of the subset of the selected broadcast messages.

94. The remotely controllable message broadcast system of claim 93 wherein each of said plurality of digital message receivers further comprises:

means, responsive to said means for receiving the locally transmitted at least one of the subset of the selected broadcast messages, for selecting a predetermined locally retransmitted at least one of the subset of the selected broadcast messages for display on said displaying means.

95. The remotely controllable message broadcast system of claim 94 wherein said means for selecting includes a keyboard.

96. The remotely controllable message broadcast system of claim 93 wherein said plurality of digital message receivers further comprises:

means for providing an alert in response to said predetermined locally retransmitted at least one of the subset of the selected broadcast messages being received by said receiving means of said digital message receiver.

97. The remotely controllable message broadcast system of claim 68 wherein said manual triggering of said transmitting means is initiated by at least one of the group consisting of a telephone, a radio, and a keyboard.

98. The remotely controllable message broadcast system of claim 62 wherein said subset of said selected remote transmitter programming instructions stored in said means for locally transmitting controls the local transmission of the at least one of the subset of said selected broadcast messages at predetermined times of the day.

99. The remotely controllable message broadcast system of claim 63 wherein said means for monitoring operational status of said plurality of remote message transmitters comprises means for monitoring the quality of the locally transmitted at least one of the subset of said selected broadcast messages which are transmitted by said means for locally transmitting, and means for monitoring the quality of the received selected broadcast messages which are received by said receiving means.

100. The remotely controllable message broadcast system of claim 62 wherein each of said plurality of remote message transmitters further comprises rechargeable battery means for supplying electrical power to said receiving means, said storing means and said locally transmitting means thereof.

101. The remotely controllable message broadcast system of claim 100 wherein said rechargeable battery means comprises solar rechargeable means.

102. The remotely controllable message broadcast system of claim 76 wherein said digital recorder/player is selected from the group consisting of a digital audio tape recorder/player and an erasable optical disk.

103. The remotely controllable message broadcast system of claim 77 wherein said random access memory is addressable.

104. The remotely controllable message broadcast system of claim 77 wherein said random access memory is formatted into a plurality of message slots.

105. The remotely controllable message broadcast system of claim 104 wherein each of said plurality of message slots has a predetermined starting address and ending address associated therewith.

106. The remotely controllable message broadcast system of claim 104 wherein said set of remote message transmitter instructions includes at least one message slot identifying instruction for identifying the message slot for storing a broadcast message therein.

107. The remotely controllable message broadcast system of claim 62 wherein said set of remote message transmitter programming instructions includes at least one instruction for formatting said means for storing therein a subset of said selected broadcast messages.

108. The remotely controllable message broadcast system of claim 62 wherein said central programming station further comprises means, responsive to said storing means of said central programming station, for storing therein an index of the library of broadcast messages, and wherein said remote message transmitters further comprise means, responsive to said storing means of said remote message transmitters, for storing therein an index of the subset of said selected broadcast messages.

109. The remotely controllable message broadcast system of claim 62 wherein said set of remote message transmitter programming instructions includes at least one instruction for defining said predetermined sequence.

110. The remotely controllable message broadcast system of claim 62 wherein said set of remote message transmitter programming instructions includes at least one instruction for determining the number of repetitions of a predetermined one of said broadcast messages.

111. The remotely controllable message broadcast system of claim 62 wherein said set of remote message transmitter programming instructions includes at least one instruction for defining a priority for locally transmitting said at least one of the subset of said selected broadcast messages.

112. The remotely controllable message broadcast system of claim 62 wherein said set of remote message transmitter instructions includes at least one instruction for defining a start and a stop time for said at least one of the subset of said selected broadcast messages.

113. The remotely controllable message broadcast system of claim 62 wherein said means for locally transmitting at least one of the subset of said selected broadcast messages further comprises means for inserting a gap between said at least one of said selected broadcast messages in said predetermined sequence during local transmission of said at least one of said selected broadcast messages by said locally transmitting means.

114. The remotely controllable message broadcast system of claim 78 wherein said license free transmitter is selected from the group consisting of a license free radio transmitter and a license free microwave transmitter.

115. A message broadcast system comprising:

a remote message transmitter and a plurality of repeaters;

said remote message transmitter comprising:

means for receiving broadcast messages and remote message transmitter programming instructions;

means for storing therein received broadcast messages and received remote message transmitter programming instructions; and means for locally transmitting at least one of the stored broadcast messages, in a predetermined sequence under control of the remote transmitter programming instructions stored therein;

each of said plurality of repeaters being located to receive the locally transmitted at least one of the stored broadcast messages, each of said plurality of repeaters comprising:

means for receiving the locally transmitted at least one of the stored broadcast messages; and means for locally retransmitting the received locally transmitted at least one of the stored broadcast messages.

116. The message broadcast system of claim 115 wherein said broadcast messages include audio messages.

117. The message broadcast system of claim 115 wherein said broadcast messages include digital information messages.

118. The message broadcast system of claim 115 wherein said means for storing therein received broadcast messages comprises a digital recorder having a predetermined number of message slots therein, with each slot having a predetermined message length; and means for storing therein the received broadcast messages in appropriate ones of said message slots.

119. The message broadcast system of claim 115 wherein the means for storing therein received broadcast messages comprises a digital recorder/player adapted to simultaneously record and play received broadcast messages, whereby said at least one of the received broadcast messages may be locally transmitted at the same time a received broadcast message is stored therein, to provide uninterrupted local transmission of broadcast messages.

120. The message broadcast system of claim 115 wherein said digital recorder/player comprises:

a random access memory;

first and second coder/decoders connected to said random access memory;

said first coder/decoder including means for sampling a received broadcast message, means for digitizing the sampled received broadcast message, and means for storing the digitized received broadcast message at a first predetermined address in said random access memory;

said second coder/decoder including means for reading a received broadcast message from a second predetermined address in said random accessory memory, and means for converting the contents of said second predetermined address into an analog signal;

said means for storing the digitized received broadcast message and said means for reading a received broadcast message being arranged to operate during successive time intervals, whereby simultaneous storage of received broadcast messages and transmission of stored broadcast messages may occur.

121. The message broadcast system of claim 115 wherein said means for locally transmitting is selected from the group consisting of a license free transmitter and a licensed transmitter for transmitting over a predetermined local area.

122. The message broadcast system of claim 115 wherein said means for locally transmitting comprises a loudspeaker for transmitting over a predetermined local area.

123. The message broadcast system of claim 115 wherein said means for locally transmitting comprises an electronic billboard for displaying messages thereon.

124. The message broadcast system of claim 115 wherein said means for locally retransmitting is selected from the group consisting of a license free transmitter and a licensed transmitter for transmitting over a predetermined local area.

125. The message broadcast system of claim 115 wherein said means for locally retransmitting comprises a loudspeaker for transmitting over a predetermined local area.

126. The message broadcast system of claim 115 wherein said means for locally retransmitting comprises an electronic billboard for displaying messages thereon.

127. The message broadcast system of claim 115 wherein said remote message transmitter is located along a highway to provide a remotely controllable highway advisory radio system.

128. The message broadcast system of claim 115 wherein said remote message transmitter and said repeaters are located adjacent a highway exit, to provide unique advisory information for said highway exit.

129. The message broadcast system of claim 128 wherein a first remote message transmitter and its associated repeaters are located adjacent a highway exit along a first direction of traffic flow and a second remote message transmitter and its associated repeaters are located adjacent said highway exit along a second direction of traffic flow, said first remote message transmitter and its associated repeaters broadcasting at a first broadcast frequency and said second remote message transmitter and its associated repeaters broadcasting at a second broadcast frequency, whereby unique highway advisory messages may be received along said first direction at said first broadcast frequency, and along said second direction at said second broadcast frequency.

130. The message broadcast system of claim 115 wherein said means for locally transmitting comprises a license free transmitter for locally transmitting selected ones of said received broadcast messages at a first radio frequency and for locally transmitting selected ones of said received broadcast messages at a second radio frequency; and wherein said plurality of repeaters comprises a first repeater and a second repeater, said first repeater being located to receive the locally transmitted broadcast messages at said first frequency and said second repeater being located to receive the locally transmitted broadcast messages at said second frequency, whereby said remote message transmitter may locally transmit messages at said first and second frequencies, respectively.

131. The message broadcast system of claim 115 wherein said remote message transmitter and said repeaters are located adjacent a highway, said remote message transmitter further comprising: traffic detecting means for detecting vehicular traffic along the highway, and means, responsive to said traffic detecting means, for triggering said means for locally transmitting upon detecting vehicular traffic.

132. The message broadcast system of claim 115 wherein said means for locally transmitting operates continuously, to continuously transmit said received broadcast messages in the predetermined continuous sequence.

133. The message broadcast system of claim 115 wherein said remote message transmitter further comprises means for monitoring operational status of said repeaters.

134. The message broadcast system of claim 133 wherein said means for monitoring operational status comprises means for monitoring the battery voltage of said repeaters.

135. The message broadcast system of claim 115 wherein said means for locally transmitting comprises means for locally transmitting said received broadcast messages, superimposed upon a pilot tone.

136. The message broadcast system of claim 117 wherein said library of broadcast messages comprise digital information messages, said message broadcast system further comprising a plurality of digital message receivers, each comprising:

means for receiving the locally transmitted broadcast messages from an associated remote message transmitter; and means for displaying the received locally retransmitted broadcast messages.

137. The message broadcast system of claim 136 wherein each of said plurality of digital message receivers further comprises:

means, responsive to said means for receiving the locally transmitted at least one of the subset of the selected broadcast messages, for selecting a predetermined locally transmitted broadcast message for display on said displaying means.

138. The message broadcast system of claim 137 wherein said means for selecting includes a keyboard.

139. The message broadcast system of claim 136 wherein said plurality of digital message receivers further comprises:

means for providing an alert in response to said predetermined locally retransmitted broadcast messages being received by said receiving means of said digital message receiver.

140. The message broadcast system of claim 115 wherein said remote transmitter programming instructions stored in said means for locally transmitting controls the local transmission of said broadcast messages at predetermined times of the day.

141. The message broadcast system of claim 115 wherein said remote message transmitter further comprises rechargeable battery means for supplying electrical power to said receiving means, said storing means and said locally transmitting means thereof.

142. The message broadcast system of claim 141 wherein said rechargeable battery means comprises solar rechargeable means.

143. The message broadcast system of claim 115 wherein each of said plurality of repeaters further comprises rechargeable battery means for supplying electrical power to said receiving mean and said locally retransmitting means thereof.

144. The message broadcast system of claim 143 wherein said rechargeable battery means comprises solar rechargeable battery means.

145. The message broadcast system of claim 120 wherein said random access memory is addressable.

146. The message broadcast system of claim 120 wherein said random access memory is formatted into a plurality of message slots.

147. The message broadcast system of claim 146 wherein each of said plurality of message slots has a predetermined starting address and ending address associated therewith.

148. The message broadcast system of claim 146 wherein at least one of said remote message transmitter instructions includes at least one message slot identifying instruction for identifying the message slot for storing a broadcast message therein.

149. The message broadcast system of claim 115 wherein said remote message transmitter programming instructions includes at least one instruction for formatting said means for storing therein received broadcast messages.

150. The message broadcast system of claim 115 wherein said remote message transmitter programming instructions includes at least one instruction for defining said predetermined sequence.

151. The message broadcast system of claim 115 wherein said remote message transmitter programming instructions includes at least one instruction for determining the number of repetitions of a predetermined one of said broadcast messages.

152. The message broadcast system of claim 115 wherein said remote message transmitter programming instructions includes at least one instruction for defining a priority for locally transmitting received broadcast messages.

153. The message broadcast system of claim 115 wherein said remote message transmitter instructions includes at least one instruction for defining a start and a stop time for said at least one of the received broadcast messages.

154. The message broadcast system of claim 115 wherein said means for locally transmitting at least one of said broadcast messages further comprises means for inserting a gap between said at least one of said received broadcast messages in said predetermined sequence during local transmission of said at least one of said selected broadcast messages by said locally transmitting means.

155. The message broadcast system of claim 121 wherein said license free transmitter is selected from the group consisting of a license free radio transmitter and a license free microwave transmitter.

156. A central programming station for a remotely controllable message broadcast system which operates in conjunction with a plurality of remote message transmitters comprising:

means for storing therein a library of broadcast messages and a set of remote message transmitter programming instructions; and means for transmitting selected broadcast messages from said library and selected remote message transmitter programming instructions from said set to said plurality of remote message transmitter upon receipt of an external stimulus.

157. The central programming station of claim 156 further comprising means for monitoring operational status of said plurality of remote message transmitters.

158. The central programming station of claim 157 wherein said means for monitoring comprises means for successively polling each of said plurality of remote message transmitters to obtain operational status information from each of said remote message transmitters.

159. The central programming station of claim 157 wherein said means for monitoring comprises means for receiving alarms from said remote message transmitters upon occurrence of a fault condition therein.

160. The central programming station of claim 156 wherein said means for transmitting selected broadcast messages comprises long range transmission means capable of transmitting said selected broadcast messages to each of said plurality of remote message transmitters.

161. The central programming station of claim 160 where said long range transmission means is selected from the group consisting of a licensed radio link, a cellular telephone link, a licensed FM transmitter, a cable television system, an optical fiber link, and a commercial broadcast station subcarrier.

162. The central programming station of claim 156 wherein the external stimulus is selected from the group consisting of an externally generated programming command, occurrence of a predetermined time, and manual triggering of said transmitting means.

163. The central programming station of claim 156 wherein said selected remote message transmitter programming instructions comprise global programming commands for execution by all of said plurality of remote message transmission units and addressable programming commands for programming an individual one of said remote message transmitters.

164. The central programming station of claim 156 wherein said library of broadcasting messages include audio messages.

165. The central programming station of claim 156 wherein said library of broadcast messages include digital information messages.

166. The central programming station of claim 156 wherein said means for storing therein a library of broadcast messages and a set of remote message transmitter programming instructions comprises: a digital audio tape machine for storing therein a library of broadcast messages, and a random access memory for storing therein a set of remote message transmitter programming instructions.

167. The central programming station of claim 156 wherein said means for transmitting selected broadcast messages from said library comprises a digital recorder having a predetermined number of message recording slots therein, with each slot having a predetermined message length; means for formatting the selected broadcast messages from said library into appropriate ones of said message recording slots; and means for transmitting messages from selected ones of said message recording slots.

168. The central programming station of claim 156 further comprising means for retransmitting said selected broadcast messages and programming instructions, via said transmitting means, upon receipt of an indication from a remote message transmitter that a low quality transmission of messages and instructions has occurred.

169. The central programming station of claim 162 wherein said manual triggering of said transmitting means is initiated by at least one of the group consisting of a telephone, a radio and a keyboard.

170. The central programming station of claim 156 further comprising means, responsive to said storing means, for storing therein an index of the library of broadcast messages.

171. The central programming station of claim 156 wherein said set of remote message transmitter programming instructions includes at least one instruction for defining a predetermined transmission sequence for said selected broadcast messages.

172. The central programming station of claim 156 wherein said set of remote message transmitter programming instructions includes at last one instruction for determining the numbers of repetitions of a predetermined one of said selected broadcast messages.

173. The central programming station of claim 156 wherein said of remote message transmitter programming instructions includes at least one instruction for defining a priority for transmitting said selected broadcast messages.

174. The central programming station of claim 156 wherein said set of remote message transmitter instructions includes at least one instruction for defining a start and a stop time for at least one of said selected broadcast messages.

175. A remote message transmitter comprising:

means for receiving broadcast messages and remote message transmitter programming instructions;

means for storing therein said broadcast messages and said remote message transmitter programming instructions; and means for locally transmitting at least one of the stored broadcast messages, in a predetermined sequence under control of the remote transmitter programming instructions stored therein.

176. The remote message transmitter of claim 175 wherein said broadcast messages include audio messages.

177. The remote message transmitter of claim 175 wherein said broadcast messages include digital information messages.

178. The remote message transmitter of claim 175 wherein said means for storing therein said broadcast messages comprises a digital recorder having a predetermined number of message slots therein, with each slot having a predetermined message length; and means for storing therein the broadcast messages in appropriate ones of said message slots.

179. The remote message transmitter of claim 175 wherein the means for storing therein said broadcast messages comprises a digital recorder/player adapted to simultaneously record and play broadcast messages, whereby said broadcast messages may be locally transmitted at the same time a broadcast message is stored therein; to provide uninterrupted local transmission of broadcast messages.

180. The remote message transmitter of claim 179 wherein said digital recorder/player comprises:

a random access memory;

first and second coder/decoders connected to said random access memory;

said first coder/decoder including means for sampling a received broadcast message, means for digitizing the sampled received broadcast message, and means for storing the digitized received broadcast message at a first predetermined address in said random access memory;

said second coder/decoder including means for reading a received broadcast message from a second predetermined address in said random accessory memory, and means for converting the contents of said second predetermined address into an analog signal;

said means for storing the digitized received broadcast message and said means for reading a received broadcast message being arranged to operate during successive time intervals, whereby simultaneous storage of received broadcast messages and transmission of stored broadcast messages may occur.

181. The remote message transmitter of claim 175 wherein said means for locally-transmitting is selected from the group consisting of a license free transmitter and a licensed transmitter for transmitting over a predetermined local area.

182. The remote message transmitter system of claim 175 wherein said means for locally transmitting comprises a loudspeaker for transmitting over a predetermined local area.

183. The remote message transmitter of claim 175 wherein the means for locally transmitting comprises an electronic billboard for displaying messages thereon.

184. The remote message transmitter of claim 175 wherein said message transmitter is located along a highway to provide a remotely controllable highway advisory radio system.

185. The remote message transmitter of claim 175 wherein said remote message transmitter is located adjacent a highway exit, to provide unique advisory information for said highway exit.

186. The remote message transmitter of claim 185 wherein a first remote message transmitter is located adjacent a highway exit along a first direction of traffic flow and a second remote message transmitter is located adjacent said highway exit along a second direction of traffic flow, said first remote message transmitter broadcasting at a first broadcast frequency and said second remote message transmitter broadcasting at a second broadcast frequency, whereby unique highway advisory messages may be received along said first direction at said first broadcast frequency, and along said second direction at said second broadcast frequency.

187. The remote message transmitter of claim 175 wherein said means for locally transmitting comprises a license free transmitter for locally transmitting selected ones of said broadcast messages at a first radio frequency and for locally transmitting selected ones of said broadcast messages at a second radio frequency; whereby one remote message transmitter may locally transmit messages at said first and second frequencies, respectively.

188. The remote message transmitter of claim 175 further comprising: traffic detecting means for detecting vehicular traffic along the highway, and means, responsive to said traffic detecting means, for triggering said means for locally transmitting upon detecting vehicular traffic.

189. The remote message transmitter of claim 175 wherein said means for receiving broadcast messages and remote message transmitter programming instructions further comprises: means for monitoring the quality of the received messages and instructions, and mean for indicating that a low quality transmission of messages and instructions has occurred.

190. The remote message transmitter of claim 175 further comprising means for receiving external stimuli at said remote message transmitter, and wherein said means for locally transmitting comprises means for locally transmitting one of the stored broadcast messages under control of the remote transmitter programming instructions and the received external stimuli.

191. The remote message transmitter of claim 175 wherein said means for locally transmitting operates continuously, to continuously transmit said at least one of said broadcast messages in a predetermined continuous sequence.

192. The remote message transmitter of claim 175 wherein said means for locally transmitting operates at a first transmission frequency.

193. The remote message transmitter of claim 175 wherein said means for locally transmitting comprises means for locally transmitting at least one of the stored broadcast messages, superimposed upon a pilot tone.

194. The remote message transmitter of claim 177 wherein said broadcast messages comprise digital information messages, said means for receiving comprising digital message receiving means, said remote message transmitter further comprising:

means for displaying the received digital message.

195. The remote message transmitter of claim 194 wherein said digital message receiving means further comprises:

means for selecting a predetermined digital message for display on said displaying means.

196. The remote message transmitter of claim 195 wherein said means for selecting includes a keyboard.

197. The remote message transmitter of claim 194 wherein said plurality of digital message receiving means further comprises:

means for providing an alert in response to said predetermined locally transmitted broadcast messages being received by said receiving means of said digital message receiver.

198. The remote message transmitter of claim 175 wherein said remote transmitter programming instructions stored in said means for locally transmitting controls the local transmission of the selected broadcast messages at predetermined times of the day.

199. The remote message transmitter of claim 175 further comprising rechargeable battery means for supplying electrical power to said receiving means, said storing means and said locally transmitting means thereof.

200. The remote message transmitter system of claim 199 wherein said rechargeable battery means comprises solar rechargeable means.

201. The remote message of claim 180 wherein said random access memory is addressable.

202. The remote message transmitter of claim 180 wherein said random access memory is formatted into a plurality of message slots.

203. The remote message transmitter of claim 202 wherein each of said plurality of message slots has a predetermined starting address and ending address associated therewith.

204. The remote message transmitter of claim 202 wherein said remote message transmitter instructions includes at least one message slot identifying instruction for identifying the message slot for storing a broadcast message therein.

205. The remote message transmitter of claim 175 wherein said remote message transmitter programming instructions includes at least one instruction for formatting said means for storing therein a subset of said selected broadcast messages.

206. The remote message transmitter of claim 175 wherein said remote message transmitter programming instructions includes at least one instruction for defining said predetermined sequence.

207. The remote message transmitter of claim 175 wherein said remote message transmitter programming instructions includes at least one instruction for determining the number of repetitions of a predetermined one of said broadcast messages.

208. The remote message transmitter of claim 175 wherein said remote message transmitter programming instructions includes at least one instruction for defining a priority for locally transmitting said at least one of the subset of said selected broadcast messages.

209. The remote message transmitter of claim 175 wherein said remote message transmitter instructions includes at least one instruction for defining a start and a stop time for said broadcast messages.

210. The remote message transmitter of claim 175 wherein said means for locally transmitting said broadcast messages further comprises means for inserting a gap between said broadcast messages in said predetermined sequence during local transmission of said at least one of said selected broadcast messages by said locally transmitting means.

211. The remote message transmitter of claim 181 wherein said license free transmitter is selected from the group consisting of a license free radio transmitter and a license for microwave transmitter.

212. A digital recorder/player for simultaneously recording and playing digital messages, comprising:

a random access memory;

first and second coder/decoders connected to said random access memory;

said first coder/decoder including means for sampling a message, means for digitizing the sampled message, and means for storing the digitized message at a first predetermined address in said random access memory;

said second coder/decoder including means for reading a message from a second predetermined address in said random accessory memory, and means of reconverting the contents of said second predetermined address into an analog signal;

said means for storing the digitized message and said means for reading a message being arranged to operate during successive time intervals, whereby simultaneous storage of received broadcast messages and playback of stored messages may occur.

213. The digital recorder/player of claim 212 wherein said random access memory is addressable.

214. The digital recorder/player of claim 212 wherein said random access memory is formatted into a plurality of message slots.

215. The digital recorder/player of claim 214 wherein each of said plurality of message slots has a predetermined starting address and ending address associated therewith.

* * * * *

UNITED STATES PATENT AND TRADEMARK OFFICE
CERTIFICATE OF CORRECTION

PATENT NO. : 5,133,081

DATED : July 21, 1992

INVENTOR(S) : Mayo

It is certified that error appears in the above-identified patent and that said Letters Patent is hereby corrected as shown below:

Column 10, line 40, after "message", please insert --.--.

Column 15, line 2, "704" should be --724--.

Column 15, line 19, "709" should be --729--.

Column 15, line 30, "719" should be --729--.

Column 18, line 46, "910" should be --913--.

Signed and Sealed this

Thirty-first Day of August, 1993

Attest:

BRUCE LEHMAN

*Attesting Officer* *Commissioner of Patents and Trademarks*